United States Patent [19]

Chul

[11] Patent Number: 4,964,803
[45] Date of Patent: Oct. 23, 1990

[54] DEVICE FOR DISPLAYING OPERATION OF A MICROCOMPUTER AND METHOD OF DISPLAYING OPERATION THEREOF

[76] Inventor: Kim K. Chul, 11-1, Bukahhyun-Dong, Seodaemun-Ku, Seoul, Rep. of Korea

[21] Appl. No.: 327,191
[22] PCT Filed: Jun. 24, 1988
[86] PCT No.: PCT/KR88/00012
 § 371 Date: Feb. 27, 1989
 § 102(e) Date: Feb. 27, 1989
[87] PCT Pub. No.: WO88/10484
 PCT Pub. Date: Dec. 29, 1988

[30] Foreign Application Priority Data

Jun. 26, 1987 [KR] Rep. of Korea ............ 87-6531[U]

[51] Int. Cl.⁵ .................................... G09B 19/00
[52] U.S. Cl. ............................ 434/118; 364/521; 364/900
[58] Field of Search ............ 434/118; 371/20.4, 22.1; 364/521

[56] References Cited

U.S. PATENT DOCUMENTS

| 3,372,381 | 3/1968 | Raspanti | 434/118 X |
| 3,844,564 | 10/1974 | Barish | 434/118 X |
| 4,348,761 | 9/1982 | Berger | 371/21.1 |
| 4,517,671 | 5/1985 | Lewis | 371/19 |

FOREIGN PATENT DOCUMENTS

| 2205535 | 5/1973 | Fed. Rep. of Germany | 434/118 |
| 0022622 | 1/1977 | Japan . | |
| 0132245 | 11/1978 | Japan . | |
| 0138150 | 10/1980 | Japan . | |
| 0028441 | 8/1984 | Japan . | |

Primary Examiner—Richard J. Apley
Assistant Examiner—Joe H. Cheng
Attorney, Agent, or Firm—Varndell Legal Group

[57] ABSTRACT

The present invention is directed to a microcomputer training apparatus which is useful as a teaching aid for learning about the operation of a microcomputer. The present invention includes a front panel having a display section including numeral displays and light-emitting diodes corresponding to a variety of registers and memory in a central processing unit which represents a microcomputer. The present invention also includes a data bus display unit connecting the various register and memory displays having light-emitting diodes which are linearly arranged and which visually display the transfer of data across the data bus from one register to another, etc.

13 Claims, 30 Drawing Sheets

FIG. 2( c )
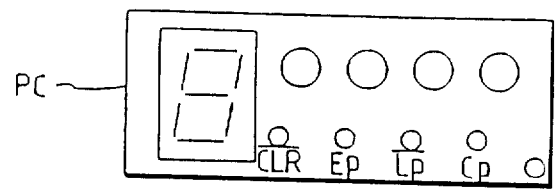
FIG. 2( d )
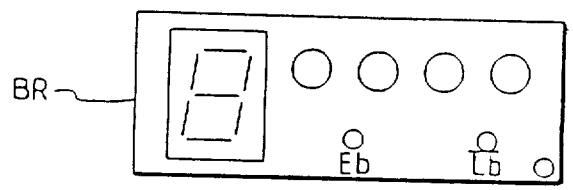
FIG. 2( e )
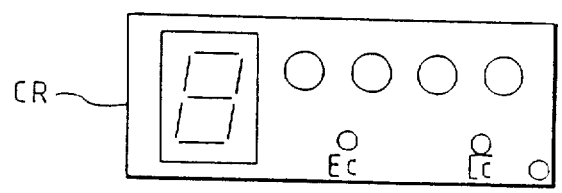
FIG. 2( f )
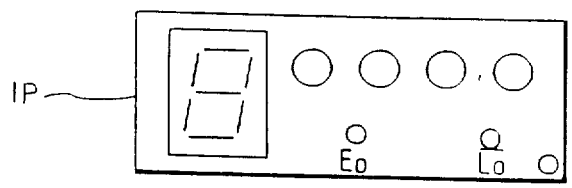

FIG. 2( h )
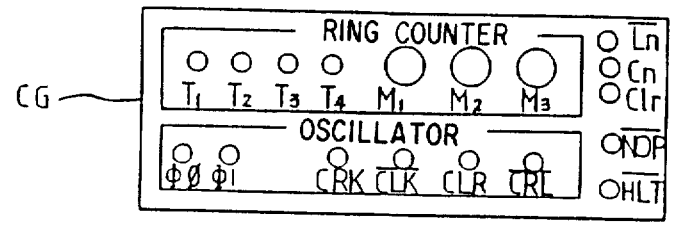
FIG. 2( i )
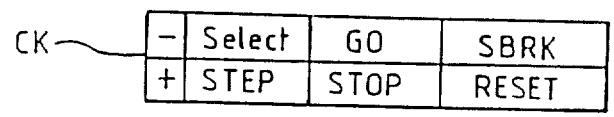
FIG. 2( j )
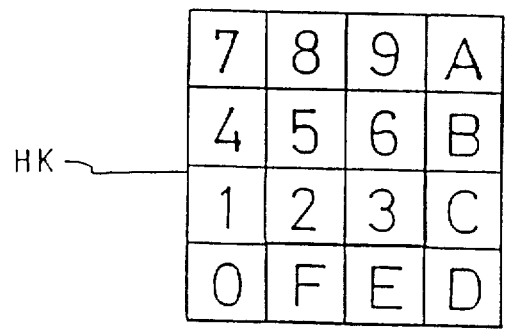

FIG. 18
TABLE 1: INSTRUCTION SET

| operation code | instruction | operational symbol |
|---|---|---|
| 0 | NOP | |
| 1 | ADD A | A   A + A |
| 2 | ADD B | A   A + B |
| 3 | ADC B | A   A + B + Carry |
| 4 | ADD C | A   A + C |
| 5 | ADC C | A   A + C + Carry |
| 6 | MOV A,B | A   B |
| 7 | MOV B,A | B   A |
| 8 | MOV A,C | A   C |
| 9 | MOV C,A | C   A |
| A | MVI A, byte | A   byte |
| B | LDA (addr) | A   (addr) |
| C | STA (addr) | (addr)   A |
| D | JMP addr | |
| E | IN A | A   IP |
| F | HLT | |

FIG. 19
TABLE 2: ADDRESS ROM

| address | routine | content |
|---|---|---|
| 0 | NOP | 34 |
| 1 | ADD A | 04 |
| 2 | ADD B | 07 |
| 3 | ADC B | 0A |
| 4 | ADD C | 0D |
| 5 | ADC C | 10 |
| 6 | MOV A,B | 13 |
| 7 | MOV B,A | 15 |
| 8 | MOV A,C | 17 |
| 9 | MOV C,A | 19 |
| A | MVI A,byte | 1B |
| B | LDA (addr) | 20 |
| C | STA (addr) | 27 |
| D | JMP addr | 2E |
| E | IN A | 32 |
| F | HLT | 35 |

FIG. 20
TABLE 3: CONTROL ROM

| address | routine | content | control signal | instruction cycle T | instruction cycle M |
|---|---|---|---|---|---|
| ØØ | fetch | 75504 | $E_p$ , $\overline{L_m}$ | $T_1$ | $M_1$ |
| Ø1 |  | B5514 | $C_p$ | $T_2$ | $M_1$ |
| Ø2 |  | 3553Ø | $E_m$ , $\overline{L_d}$ | $T_3$ | $M_1$ |
| Ø3 |  | 2551C | $E_d$ , $\overline{L_i}$ | $T_1$ | $M_1$ |
| Ø4 | ADD A | 3C514 | $E_a$ , $\overline{L_t}$ | $T_1$ | $M_2$ |
| Ø5 |  | 33514 | $E_u$ , $\overline{L_a}$ | $T_2$ | $M_2$ |
| Ø6 |  | 35514 |  |  |  |
| Ø7 | ADD B | 34D14 | $E_b$ , $\overline{L_t}$ | $T_1$ | $M_2$ |
| Ø8 |  | 33514 | $E_u$ , $\overline{L_a}$ | $T_2$ | $M_2$ |
| Ø9 |  | 35514 |  |  |  |
| ØA | ADC B | 34D14 | $E_b$ , $\overline{L_t}$ | $T_1$ | $M_2$ |
| ØB |  | 33554 | $E_u$ , $\overline{L_a}$ , $E_r$ | $T_2$ | $M_2$ |
| ØC |  | 35514 |  |  |  |
| ØD | ADD C | 34714 | $E_c$ , $\overline{L_t}$ | $T_1$ | $M_2$ |
| ØE |  | 33514 | $E_u$ , $\overline{L_a}$ | $T_2$ | $M_2$ |
| ØF |  | 35514 |  |  |  |
| 1Ø | ADC C | 34714 | $E_c$ , $\overline{L_t}$ | $T_1$ | $M_2$ |
| 11 |  | 33554 | $E_u$ , $\overline{L_a}$ , $E_r$ | $T_2$ | $M_2$ |
| 12 |  | 35514 |  |  |  |
| 13 | MOV A,B | 31D14 | $E_b$ , $\overline{L_a}$ | $T_1$ | $M_2$ |
| 14 |  | 35514 |  |  |  |

FIG. 20 (CONTINUED)

| | | | | | |
|---|---|---|---|---|---|
| 15 | MOV B,A | 3D114 | $E_a$ , $\overline{L_b}$ | $T_1$ | $M_2$ |
| 16 | | 35514 | | | |
| 17 | MOV A,C | 31714 | $E_c$ , $\overline{L_a}$ | $T_1$ | $M_2$ |
| 18 | | 35514 | | | |
| 19 | MOV C,A | 3D414 | $E_a$ , $\overline{L_c}$ | $T_1$ | $M_2$ |
| 1A | | 35514 | | | |
| 1B | MVI A,byte | 75504 | $E_p$ , $\overline{L_m}$ | $T_1$ | $M_2$ |
| 1C | | B5514 | $C_p$ | $T_2$ | $M_2$ |
| 1D | | 35530 | $E_m$ , $\overline{L_d}$ | $T_3$ | $M_2$ |
| 1E | | 3151C | $E_d$ , $\overline{L_a}$ | $T_4$ | $M_2$ |
| 1F | | 35514 | | | |
| 20 | LDA (addr) | 75504 | $E_p$ , $\overline{L_m}$ | $T_1$ | $M_2$ |
| 21 | | B5514 | $C_p$ | $T_2$ | $M_2$ |
| 22 | | 35530 | $E_m$ , $\overline{L_d}$ | $T_3$ | $M_2$ |
| 23 | | 3550c | $E_d$ , $\overline{L_m}$ | $T_4$ | $M_2$ |
| 24 | | 35530 | $E_m$ , $\overline{L_d}$ | $T_1$ | $M_3$ |
| 25 | | 3151C | $E_d$ , $\overline{L_a}$ | $T_2$ | $M_3$ |
| 26 | | 35514 | | | |
| 27 | STA (addr) | 75504 | $E_p$ , $\overline{L_m}$ | $T_1$ | $M_2$ |
| 28 | | B5514 | $C_p$ | $T_2$ | $M_2$ |
| 29 | | 35530 | $E_m$ , $\overline{L_d}$ | $T_3$ | $M_2$ |
| 2A | | 3550C | $E_d$ , $L_m$ | $T_4$ | $M_2$ |

FIG. 20 (Continued)

| | | | | | |
|---|---|---|---|---|---|
| 2B | | 3D512 | $E_a, \overline{L_d}, D_r$ | $T_1$ | $M_3$ |
| 2C | | 3553E | $E_d, E_m, D_r$ | $T_2$ | $M_3$ |
| 2D | | 35514 | | | |
| 2E | JMP addr | 75504 | $E_p, \overline{L_m}$ | $T_1$ | $M_2$ |
| 2F | | 35530 | $E_m, \overline{L_d}$ | $T_2$ | $M_2$ |
| 30 | | 1551C | $E_d, \overline{L_p}$ | $T_3$ | $M_2$ |
| 31 | | 35514 | | | |
| 32 | IN A | 31515 | $E_o, \overline{L_a}$ | $T_1$ | |
| 33 | | 35514 | | | |
| 34 | NOP | 35514 | | | |
| 35 | HLT | 35514 | | | |

DEVICE FOR DISPLAYING OPERATION OF A MICROCOMPUTER AND METHOD OF DISPLAYING OPERATION THEREOF

TECHNICAL FIELD

This invention relates to a microcomputer operational display device which is helpful to microcomputer learners or beginners, and more particularly to a microcomputer operational display device wherein the individual basic operation of microcomputer components and the entire operational flow thereof, in addition to the internal architecture of the microcomputer, can be sensed visually and appreciated readily by learners. This invention also is directed to a method for displaying the operation of microcomputers in the manner mentioned above.

BACKGROUND ART

Recently, the widespread propagation of microcomputers caused many persons to consider acquiring a high degree of microcomputer knowledge, thereby leading to the publication of many guide books or manuals on microcomputers. However, beginners who had no elementary knowledge of microcomputers experienced great difficulty in understanding the operation of microcomputers by means of such books or manuals alone. That is to say, since such beginners appreciate the real operation of a microcomputer by conception alone, and have no means to confirm it visually, a great deal of time and effort was needed to understand it in spite of the many good books and manuals.

Therefore, the development of a microcomputer training apparatus which can enhance the training effect on a microcomputer by certain visual means would be very helpful to microcomputer learners or beginners. Korean utility model application publication No. 85-376 disclosed "a transparent plate to be used as a teaching aid for a microprocessor" which allows users to appreciate the operation of a microcomputer visually. The sheet plate of the aforementioned utility model, which puts a construction diagram concerning a certain operational sequence into several transparent plates in turn, could result in some training effect but could not generate high quality training effects.

SUMMARY OF THE INVENTION

Accordingly, it is a primary object of this invention to provide a device and method for visually displaying the operation of microcomputers which can be very helpful to microcomputer learners or beginners.

It is a further object of this invention to provide a microcomputer operational display device and method which can display individual basic operations of microcomputer components and the entire operational flow thereof as well as the internal architecture of the microcomputer in order to allow users to appreciate them visually and readily.

According to the present invention, on the front panel of a training apparatus for microcomputers, a display section is constituted of numeral displays and light-emitting diodes, each for a single bit (hibble, byte), corresponding to a variety of registers and memories in a central processing unit which constitutes a microcomputer. The mutual data buses thereof are composed of a series of light-emitting diodes which are linearly arranged. The display sections for the registers and memories display the contents of materials stored therein in the form of hexadecimal numbers (0–F) and binary numbers (0–1). When the contents are transferred to other places over the data buses, the LEDs are lighted in turn so that learners can see the movement of the data and thereby visually learn the operation of the microcomputer.

These and other objects and advantageous features of the invention will become more clear from the following description of the preferred embodiments taken in conjunction with the accompanying drawing.

BRIEF DESCRIPTION OF THE DRAWINGS

FIGS. 2(a) through (k) illustrate detailed diagrams of each section in FIG. 1.

FIG. 18 shows a table of an instruction set in accordance with the operation codes.

FIG. 19 shows a table of contents of the address read only memories.

FIG. 20 shows a table of contents of the control read only memories.

BEST MODE FOR CARRYING OUT THE INVENTION

Figure 1:
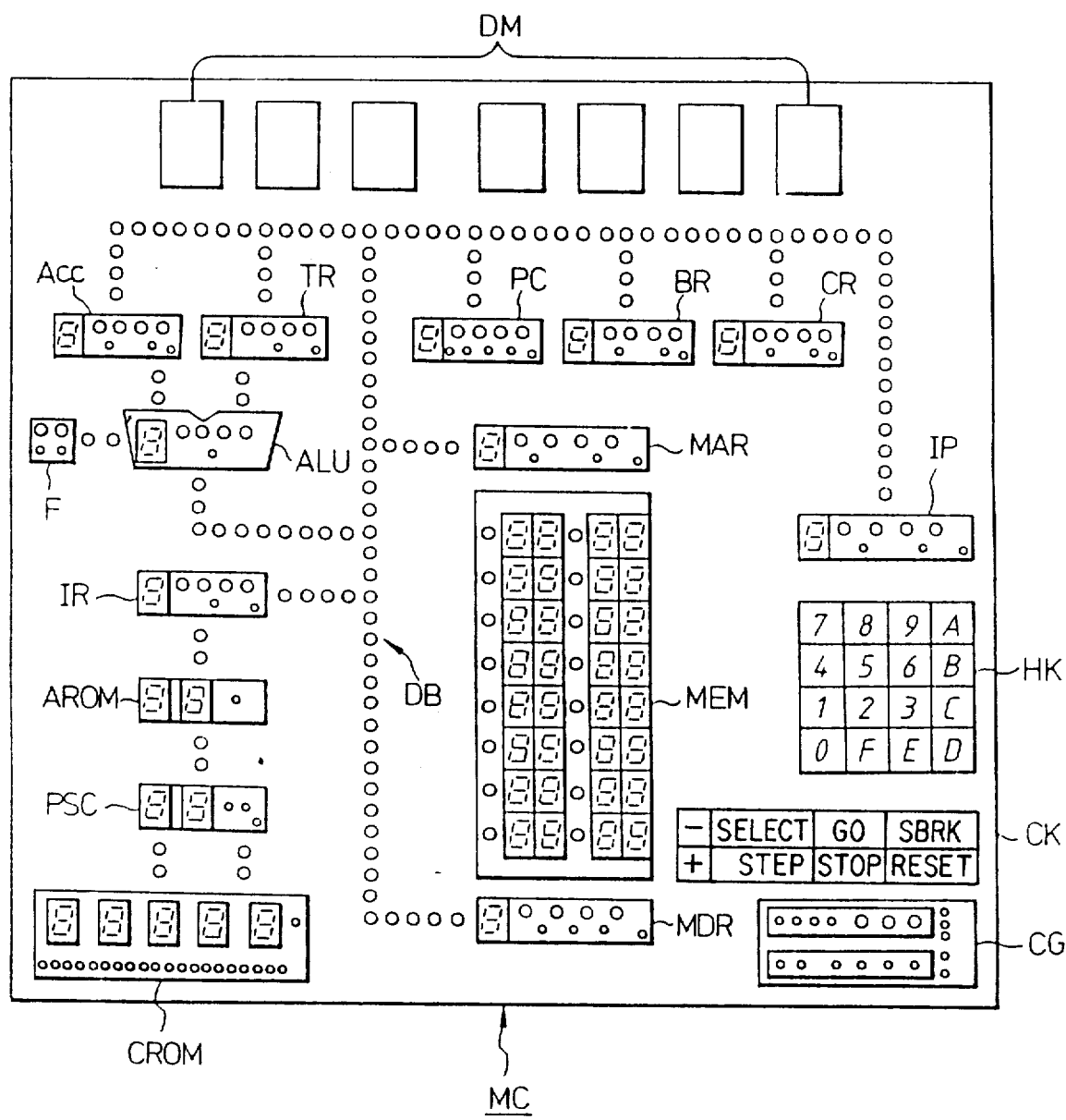
FIG. 1 is a front view of an operational display device for a four bit microcomputer according to the present invention.

FIG. 1 is a front view of the operational display device for a four bit microcomputer MC according to one embodiment of the invention. As shown in FIG. 1, in a front panel of the box-shaped operational display device for a microcomputer MC, that is, the microcomputer training apparatus, there is established divisionally an arithmetic unit display section ALU, an accumulator display section ACC, a program counter display section PC, an instruction register display section IR, a T.B.C. register display section TR, BR and CR and a flag display section F, for displaying the configuration and operation of a central processing unit (CPU) in the microcomputer; an address read only memory (ROM) display section AROM, a presettable counter display section PSC and a control ROM display section CROM, for displaying the configuration and operation of instruction control units in the microcomputer; a memory display section MEM, a memory address register display section MAR and a memory register display section MDR, for displaying the configuration and operation of storage units in the microcomputer; an input port display section IP for displaying the configuration and operation of input interface units in the microcomputer; and a clock generator display section CG for displaying the configuration and operation of clock generators in the microcomputer. Further, among each of said display sections there is arranged interconnectedly a data bus display section or unit DB corresponding to the data and address bus of the microcomputer; also installed are a hexadecimal keyboard HK corresponding to the input device of microcomputer, and a control keyboard CK corresponding to the external control device of the microcomputer, respectively. Each of said display sections includes one or more numeral displays and a group of light-emitting diodes (LED's) formed by a bit configuration, and said data bus display section includes a serial connection of LED's. Also, in the upper portion of the front panel of the training apparatus MC, there is provided a character display section DM consisting of character displays in a 5×7 dot matrix.

Hereinafter, the preferred embodiments of the present invention as described above and the operational display method thereof will be explained in detail with reference to FIGS. 2 through 20.

Herein, for the sake of simplicity of description, the word "display section" in the title of said respective sections will be omitted. For example, "instruction register display section" is hereinafter referred to as "instruction register".

Figure 2A:
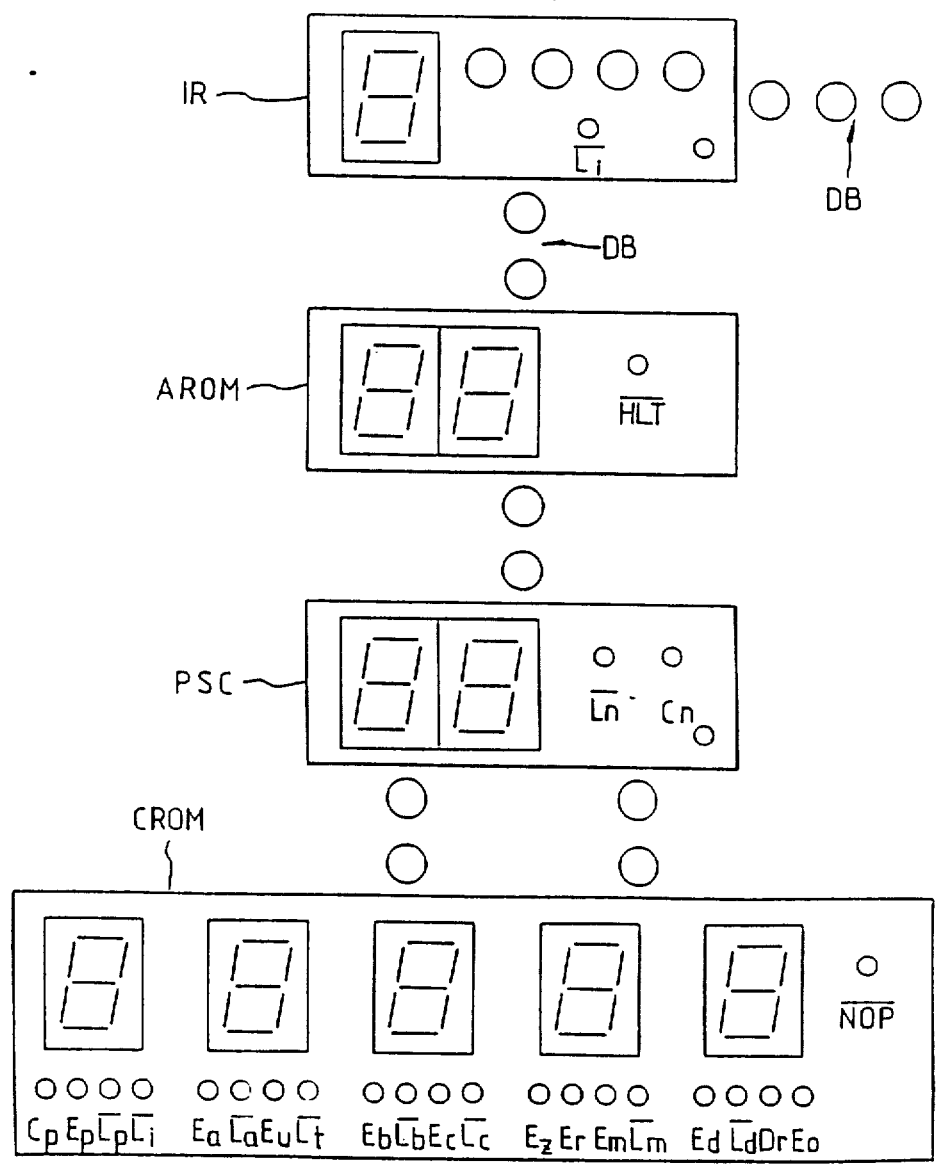

With reference to FIG. 2(a), the instruction register IR, the address ROM (AROM) serves as a decoder of said instruction register IR, and the presettable counter PSC and the control ROM (CROM) are interconnectedly associated by way of the data bus DB.

The control ROM (CROM) comprises five numeral displays and LED groups which consist of sets of four monochromatic light-emitting diodes corresponding to four bits and are represented by control words below them. Said numeral displays indicate hexadecimal numbers 0-9 and A-F, and said monochromatic LED groups are selectively turned on in accordance with the logic state when a hexadecimal number indicated on each of numeral displays allows to be corresponded to a binary number 1 or 0, that is, "high" or "low", and thus this indicates that each of control word is a operation state. LEDs having no bar above their control words are turned on when their control words are in a high state, while LEDs having a bar above their control words are turned on when their control words are in a low state. For example, if the content decoded in the control ROM (CROM) was 3C514, such an indication as denoted in the following display example occurs to, selectively turn on LEDs represented by control words Ea and Lt.

Display Example 1

```
    3           C             5
 0  0  1  1   1  1  0  0   0  1  0  1
 Cp Ep L̄p L̄i  Ea L̄a Eu L̄t  Eb L̄b Ec L̄c 1           4
 0  0  0  0   0  1  0  0
 Ez Er Em L̄m  Ed L̄d Dr Eo
```

Figure 15:
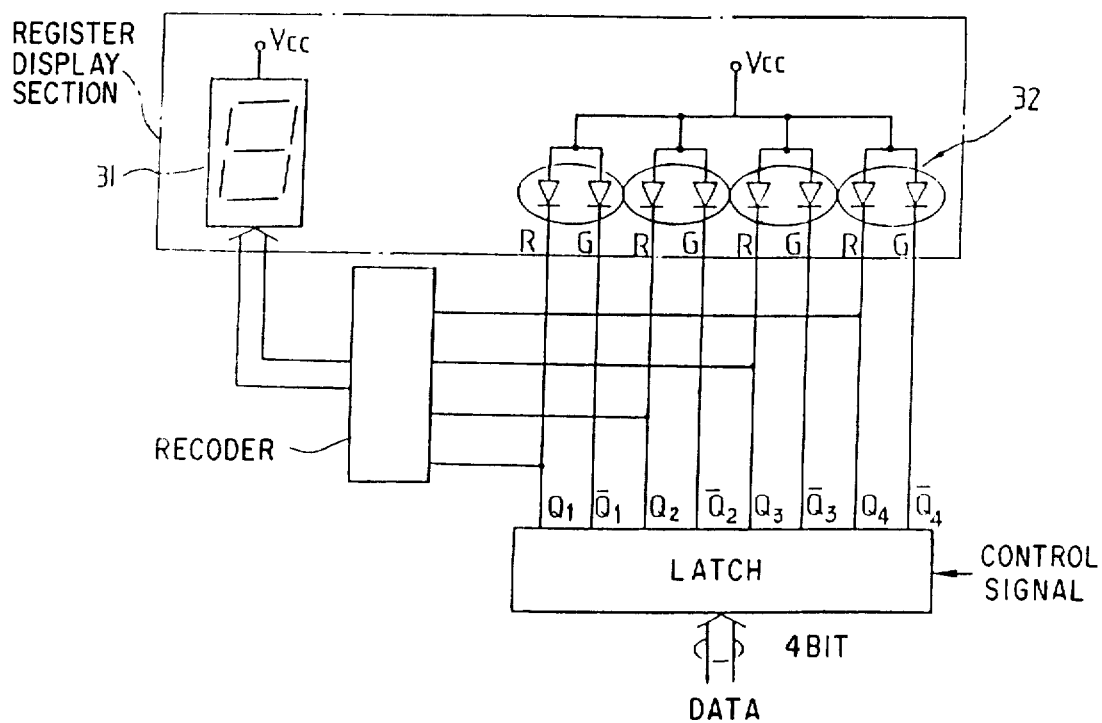
FIG. 15 is a circuit diagram of the register display section according to the present invention.

An NOP signal is generated when any LED of a control word is not lighted to initialize a ring counter (which will be described hereinafter), and to turn on the LED marked with NOP. The instruction register IR consists of one numeral display and four two-colored (red and green) LED's and allows the operational code of instruction to be displayed in both hexadecimal and binary form. The configuration of said two-colored LED's is illustrated in FIG. 15. To display a binary number by these LED's can be accomplished by corresponding the red LED to "1" and the green LED to "0".

Display Example 2

| $B_H$ → | 1011 | → | RGRR | (wherein, R is red and G is green) |

A control signal of the instruction register IR is $\overline{Li}$. The signal $\overline{Li}$ allows the content loaded in the external bus to store into the internal device. The address ROM (AROM) consists of two numeral displays, each of which indicates the address of an instruction stored in the instruction register IR, and its control signal is $\overline{HLT}$. The signal $\overline{HLT}$ operates when an instruction of "interrupt" is decoded and interrupts the activation of an oscillator as will be described later. The presettable counter PSC also consists of two numeral displays, but its control signals are $\overline{Ln}$ and Cn. The signal $\overline{Ln}$ operates during the last cycle of fetch cycles and plays a role to bring up the content of address ROM (AROM). The signal Cn operates as a signal for clearing the internal content of the presettable counter PSC.

Figure 2B:
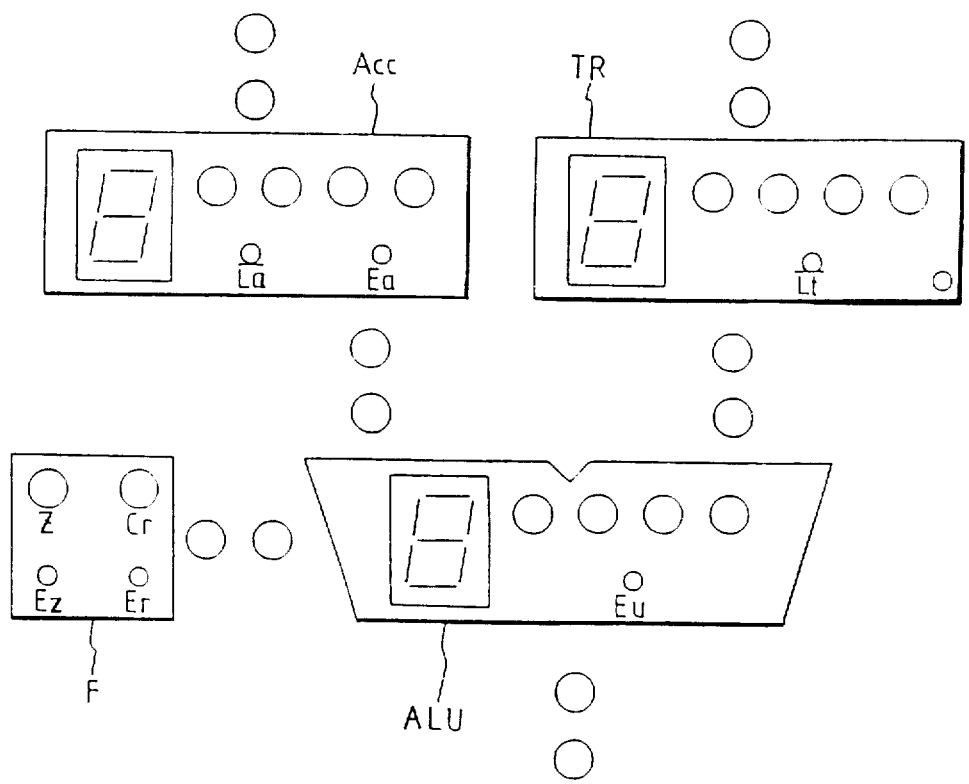

FIG. 2(b) is a detailed diagram of the operational parts in the CPU, such as an arithmetic unit ALU, an accumulator ACC, a T register TR and a flag F. The display pattern of these devices is similar to that of the instruction register IR as described above, except for that of the flag F.

The control signals of accumulator ACC are $\overline{La}$ and Ea. Control signal $\overline{La}$ allows the content of an external bus to be brought into the accumulator ACC while, on the contrary, the signal Ea allows the internal content of accumulator ACC to load into the external bus. The T register TR stores the content of the external bus into its interior by means of a control signal $\overline{Lt}$. If a control signal Eu of the arithmetic unit ALU operates, then the content of accumulator ACC is added to the content of the T register TR and thereafter the resultant value becomes loaded into the external bus. The Flag F consists of a two-colored LED Z for a zero flip-flop display and a two-colored LED Cr for a carry flip-flop display. Their control signals Ez and Er are signals for enabling the zero state and the carry state, respectively.

FIGS. 2(c) through (f) all illustrate registers, each of which is similar in configuration to the instruction register as described above. A signal $\overline{CLR}$ of control signal of the program counter PC is associated with a signal $\overline{CLR}$ in the oscillator as will be described later to clear the program counter PSC. A signal Ep allows the internal content to load into the external bus, while a signal $\overline{Lp}$ allows the content of the external bus to be brought into the interior.

Also, a signal Cp increments the internal content by one. Enable control signals of the B and C register BR and CR and of the input port IP are Eb, Ec and Eo, respectively; and load control signals for them are $\overline{Lb}$, $\overline{Lc}$ and $\overline{Lo}$, respectively. However, the signal $\overline{Lo}$ of the input port IP is generated when a hexadecimal keyboard is pressed in any state and allows the content input by the hexadecimal keyboard to be stored.

Figure 2G:
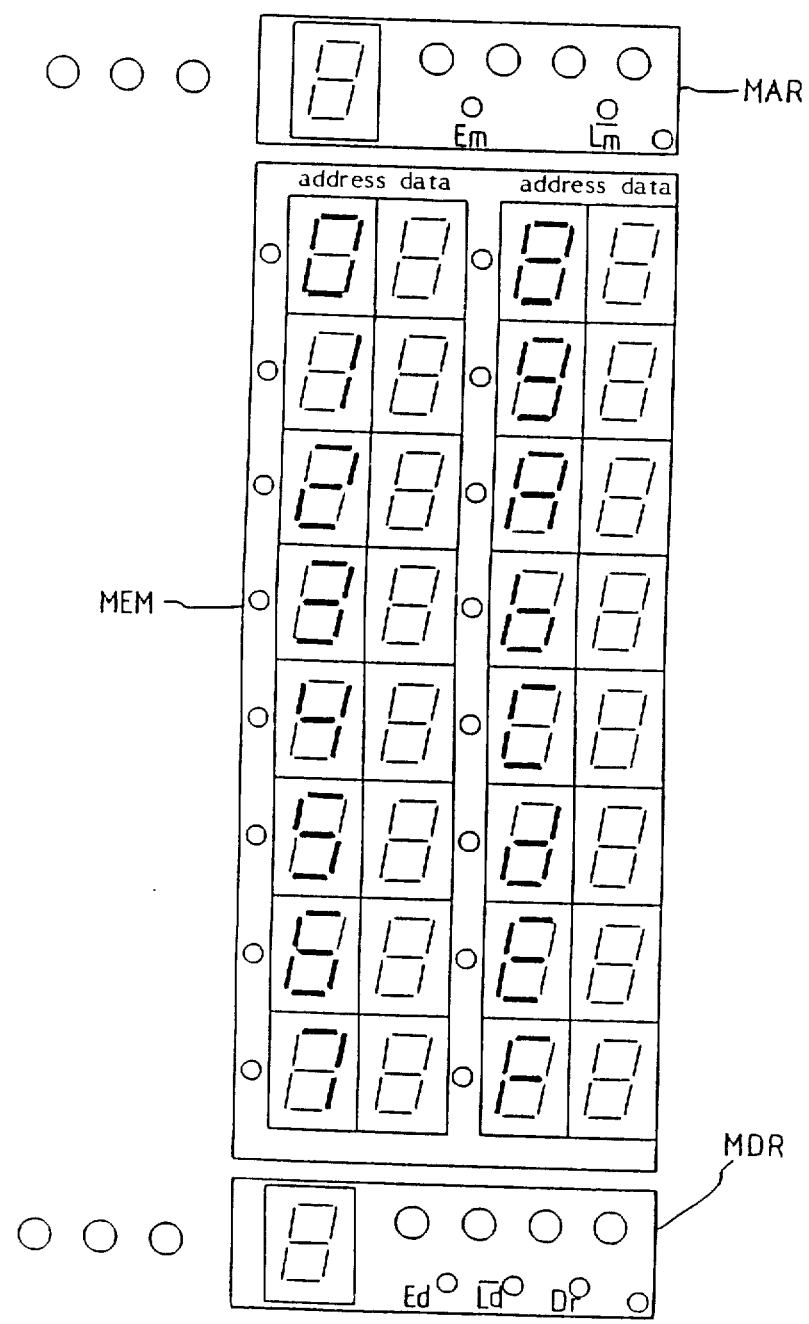

FIG. 2(g) illustrates a storage unit section which is divided into a memory MEM having sixteen addresses, a memory address register MAR and a memory data register MDR.

In the memory MEM, numeral displays for assigning addresses and numeral displays for displaying data are provided in a pair, in the left member of which a monochromatic LED for address selection display is installed. The memory address register MAR is provided for selecting an address of the memory which is intended to read or write, and the memory data register MDR reads the content selected by the memory address register or writes the content of the memory data register into the above location. Enable signals of the memory address register and data register are Em and Ed, respectively; and load signals therefor are $\overline{Lm}$ and $\overline{Ld}$, respectively. A signal $\overline{Dr}$ of the memory data register MDR represents the transfer direction of data, which, during its activation, is directed from the central processing unit to the storage unit; while, during its inactivation, is directed to the contrary. FIG. 2(h) illustrates a clock generator CG.

The clock generator CG is provided with a ring counter for indicating the basic cycles $T_1$ to $T_4$ and the machine cycles $M_1$ to $M_3$ of the instruction cycle and a clock pulse oscillator. A signal $\overline{HLT}$ is a control signal for operating together with the signal $\overline{HLT}$ of address ROM simultaneously when the "interrupt" instruction word at the instruction register is decoded and for interrupting the clock pulse. A signal $\overline{NOP}$ is associated with the signal $\overline{NOP}$ of control ROM to generate a $\overline{CLR}$ signal, thereby initializing the ring counter. A signal Cn operates at the beginning of the first basic cycle of each fetch cycle simultaneously to clear the presettable counter to its initial state. A signal $\overline{Ln}$ operates at the last cycle of each fetch cycle and is associated with the signal $\overline{Ln}$ of the presettable counter PSC as shown in FIG. 2(a). φ0 and φ1 are alternately turned on and off in accordance with the moving of data. FIG. 2(i) illustrates a control keyboard CK. The function of each key is set forth as follows:

(1) Select: serves to perform the selection of data and register.

(2) +, −:

(i) utilized in the case of incrementing or decrementing an address value which is intended to change in selecting the data by means of the "Select key", and change the data thereof by the hexadecimal keyboard.

(ii) selected by converting the registers PC, ACC, BR, CR and IP sequentially in selecting the register by means of the "Select key", and change the data of said register by the hexadecimal keyboard.

(3) SBRK: serves to perform the setting and resetting of brake point.

(4) STEP: serves to interrupt the cycle after executing one cycle.

(5) GO: serves to execute from an instruction word at the address pointed out by the current program counter.

(6) STOP: serves to perform the interruption and the continuous execution.

(7) RESET: serves to achieve the interrupted state by clearing the program counter and also by resetting the clock.

FIG. 2(j) illustrates a hexadecimal keyboard CK.

Figure 2K:
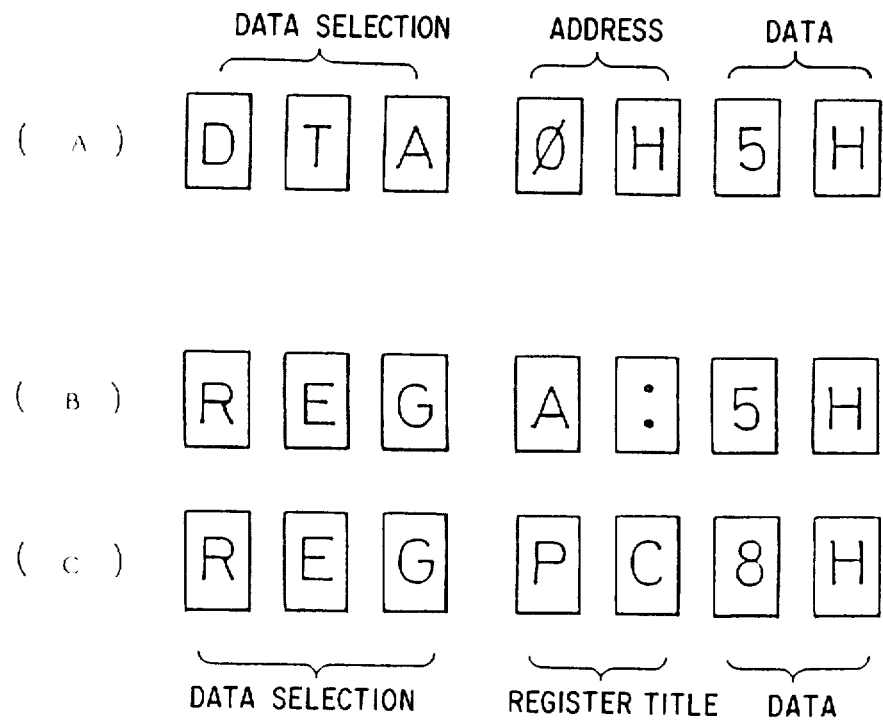

FIG. 2(k) shows examples for displaying characters in the character display section DM which displays the state of setting of each register by manipulating both the hexadecimal keyboard and the control keyboard. Specifically, (A) of FIG. 2(k) illustrates a display example for the case of selecting data by means of the "Select" key, which represents that the content of address number 0 is 5. Herein, address number (address value) can be changed by means of the "+" and "−" keys of the control keyboard, and the content thereof can be changed by means of the hexadecimal keyboard.

(B) and (C) of FIG. 2(k) illustrate display examples for the case of selecting the register by means of the "Select" key, which represent that the content of the accumulator is 5 and the content of the program counter is 8. Herein, the title of the register can be changed by means of the "+" and "−" keys, and the content thereof can changed by means of the hexadecimal keyboard. In the above drawing H means a hexadecimal number HEXA.

In the device according to the present invention as described above, the preferred embodiment for displaying the data moving of data bus and executing the program which comprises numeral displays and four-bit LED groups provided for various registers and memories and a series of LED will be explained hereinafter.

EMBODIMENT 1

The content stored as hexadecimal numbers O to F is displayed on the number display installed for each register or memory.

EMBODIMENT 2

Four bit two-colored LED groups installed in each register allow the stored data to be displayed as a binary number by ultilizing two-colored LED's with a red part and a green part. To display binary number is accomplished by corresponding the red LED to "1" to turn it on and at the same time by corresponding the green LED to "0" to turn it on (See Display example 2). The circuit applied to various register display sections according to the present invention as described above is shown in FIG. 15. Specifically, if a certain four bit data is input to the latch in the state that a voltage Vcc is input to a numeral display 31 and a two-colored LED group 32, then its output terminals $Q_1$–$Q_4$ and $\overline{Q_1}$–$\overline{Q_4}$ become high or low state corresponding to the input data to connect the red terminal R of the two-colored LED group 32 with the green terminal G thereof, so that the aforementioned input data is displayed as a binary number. At the same time, since the clock of the decoder opens the segment selected in the same condition, the hexadecimal number of the same content is displayed on the numeral display 31.

EMBODIMENT 3

Figure 16:
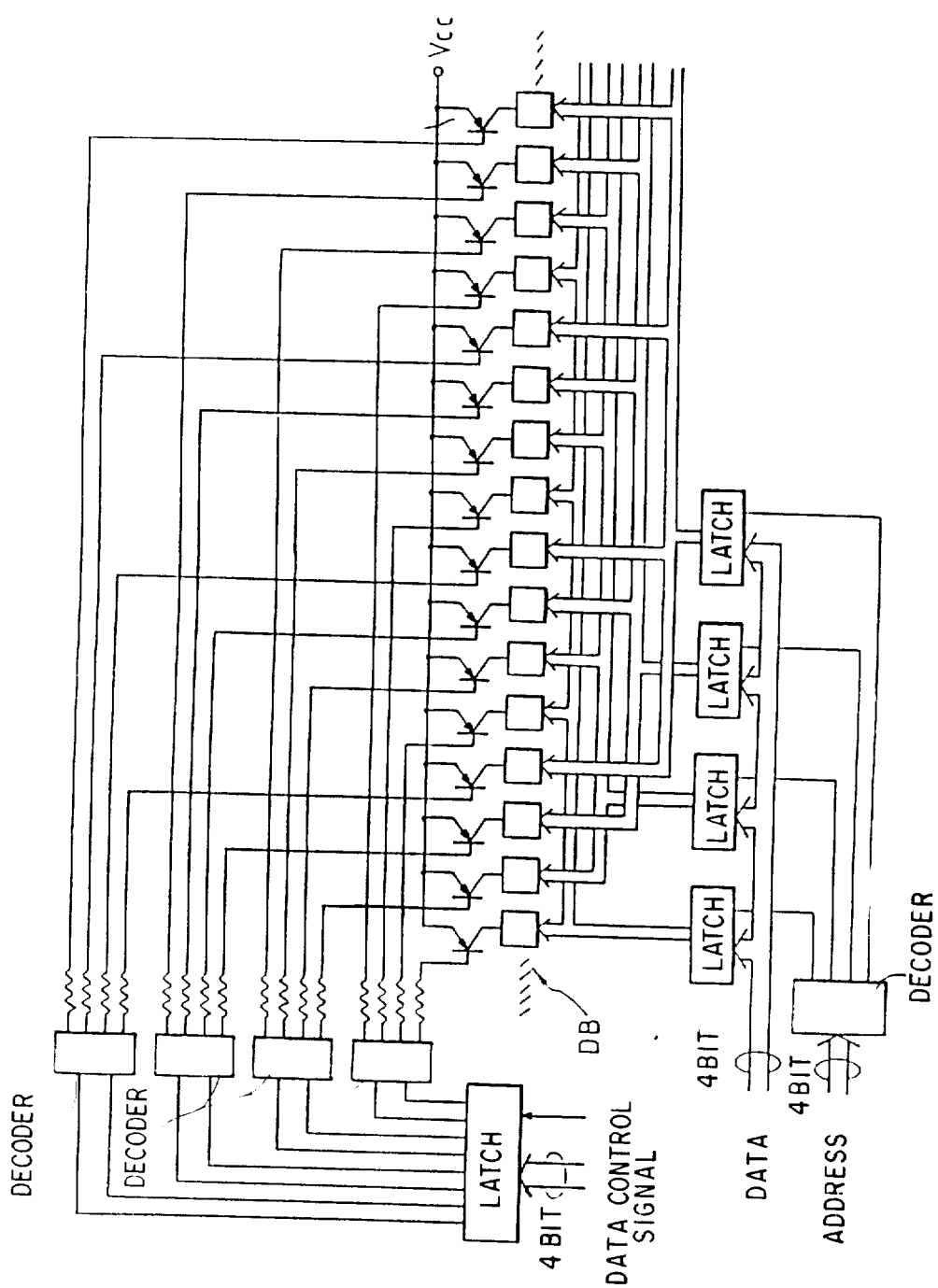
FIG. 16 is a circuit diagram of the data bus display section according to the present invention.
Figure 17:
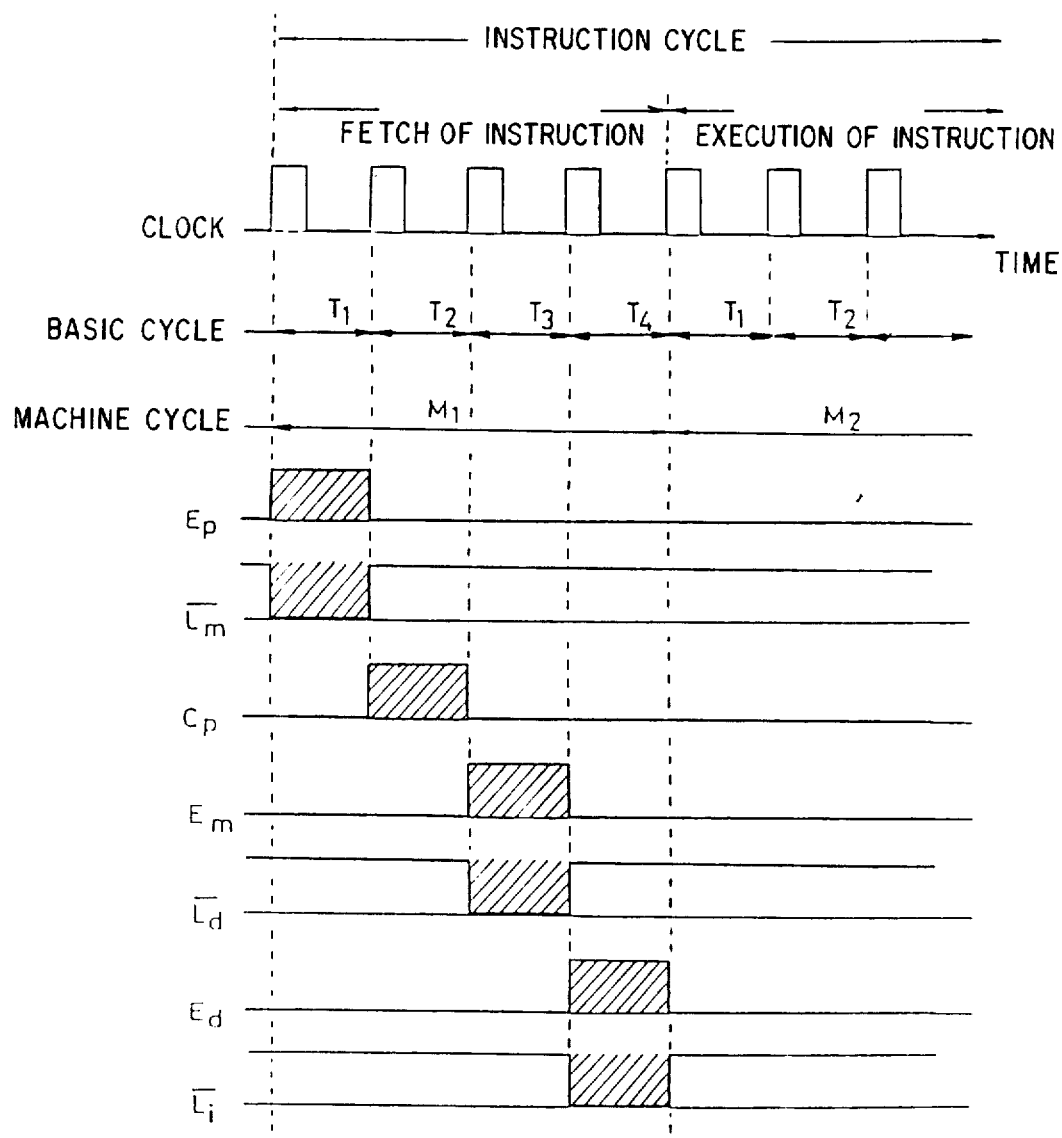
FIG. 17 shows signal waveforms of clock pulse and control signal during fetch cycles.

A plurality of two-colored LED series constituting the data bus DB also displays such data as loaded at Embodiment 2 in a binary form by utilizing two-colored LED's and then bit-by-bit shift them, thereby turning them on in order to show that real data are shifting in a binary form. A circuit diagram of this embodiment is shown in FIG. 16.

The moving state of data will be explained in more detail with reference to FIG. 3. As an example, the case of putting the content stored in the accumulator Acc onto the data bus DB and then bringing it to B register BR will be explained hereinafter. In depicting the turn-on state of the LED in the drawing, as a matter of convenience, so far as the monochromatic LED is concerned, the turn-on of red LED is symbolized by ◐; the turn on state of green ◑; and the flickering state ◉, while so far the two-colored LED is concerned the red color is symbolized by ◐; the green color ◑; the turned on state as any one color of them ⊗; and the turn-off state is not symbolize, that is, it is represented by ○.

Figure 3A:
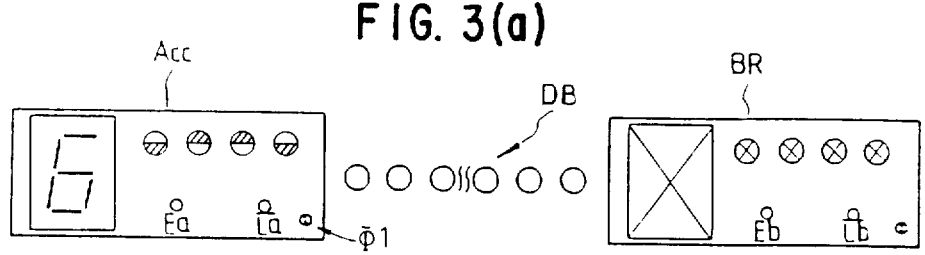
FIG. 3(a)–(n) illustrates one embodiment of the invention which shows a data shift display method for a four bit microcomputer.
Figure 3B:
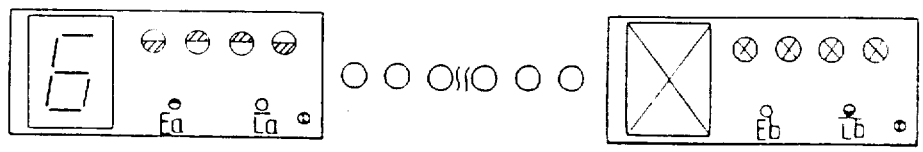
Figure 3C:
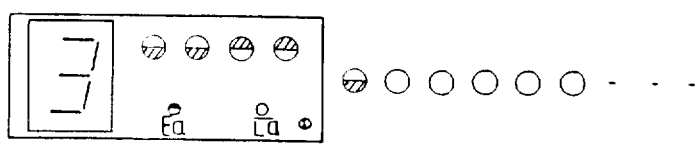
Figure 3D:
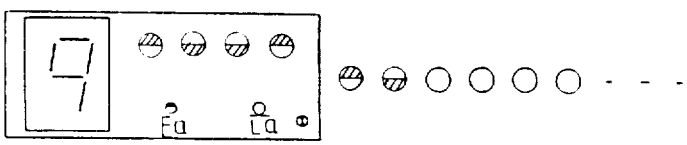
Figure 3E:
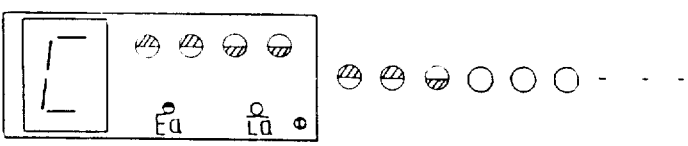
Figure 3F:
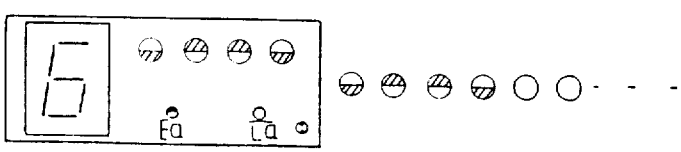
Figure 3G:
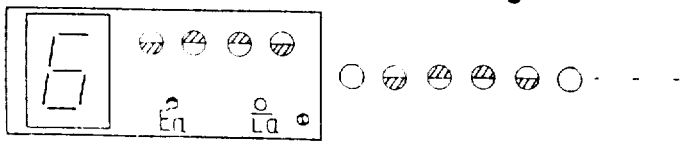
Figure 3H:
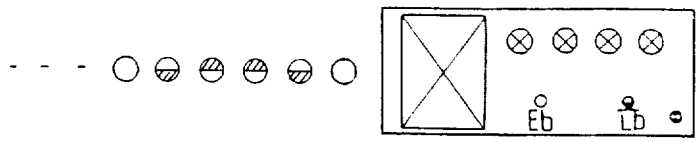
Figure 3I:
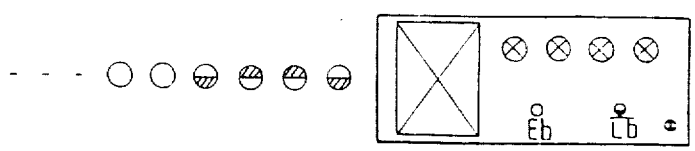
Figure 3J:
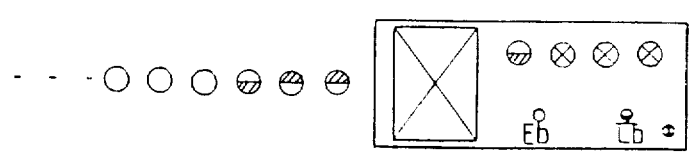
Figure 3K:
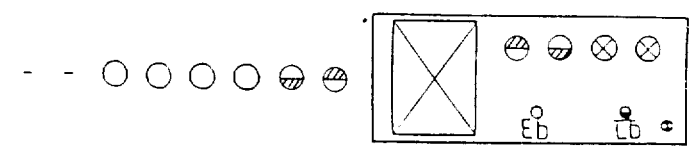
Figure 3L:
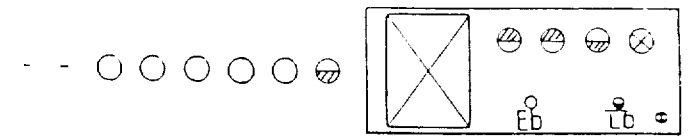
Figure 3M:
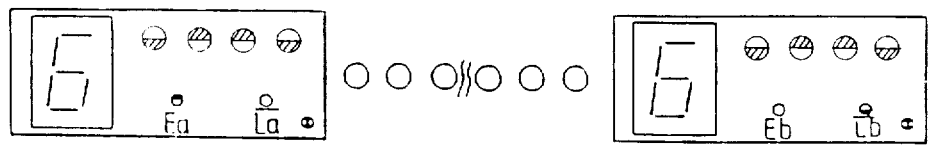

FIG. 3(a) illustrates an initial state. A hexadecimal content 6 at the accumulator Acc is displayed as the sequential colors of (green, red, red, green) indicating a binary number of 0110; since a control signal is at the initial state all LED's are turned off; and a signal $\phi_1$ flickers together with the $\phi_1$ signal of the clock generator. FIG. 3(b) illustrates a state such that a signal Ea of accumulator Acc and a signal $\overline{Lb}$ of B register BR by a control signal decoded at the control ROM (CROM) are turned on simultaneously and become gated respectively.

Figure 3N:
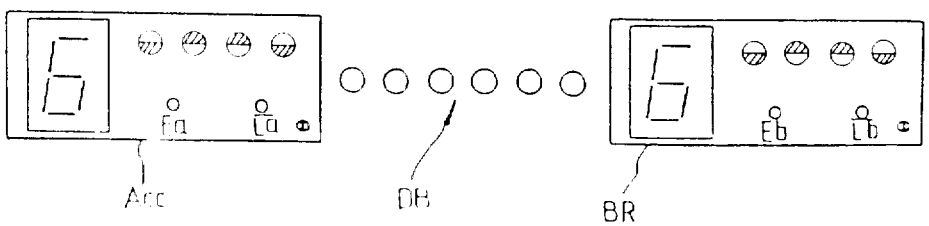

Accordingly, the turn-on state of (green, red, red, green) indicating the same binary number 0110 is shifted by one bit to the right and then the content thereof is put onto the data bus, as shown in FIG. 3(c) to (f). If the content of accumulator Acc is put onto the data bus DB entirely, then the content of the accumulator remains at the initial state 6 and the state of 0110, i.e., (green, red, red, green); and the content loaded onto the data bus DB is bit-by-bit transfered continuously in the same state (See (f) through (i)). FIGS. 3(j) through (m) illustrate a state such that the data of 0110 arrived at the B register BR is shifted by one bit from the least significant bit thereof and then is moved and stored into the most significant bit of the interior of B register. FIG. 3(n) illustrates a state such that the data moving is completed, which indicates that control signals Ea and $\overline{La}$ were turned off together with a control signal of control ROM (CROM) and both of the registers have the same content.

By carrying out the present invention in the manner described above, the operation of microcomputers can be observed visually. The operation of the embodiments according to the present invention is connected with a real microcomputer as seen in FIG. 15 and FIG. 16, and controlled in accordance with the processed information contents, so that the information processing operation of a microcomputer can be displayed as it really is to enhance the training effect.

Now, we should know how the entire operation executed under the given instruction is displayed.

First, the instruction set is described in the attached Table 1, the content stored in the address ROM is described in the attached Table 2 and the content in the control ROM is described in the attached Table 3.

For the procedure of executing the program base upon such contents, the operational display state of the present invention will be described for the routine execution according to the following several instructions.

To turn on the power supply (not shown) achieves an initial state; and if the key "CTO" in the control keyboard CK is pressed in the state of setting a certain content at each data or register, clock pulses are generated periodically at the clock generator in the same manner as FIG. 2(h) to turn on the LED's and at the same time the fetch cycle which allows the instruction to be brought initially is started in accordance with said signals. If the fetch cycle is completed, an execution cycle of the instruction which then was brought is started. The fetch cycle is performed during the basic cycles $T_1$ to $T_4$ of $M_1$ cycle and the execution cycle for each instruction should refer Table 3.

(1) fetch cycle ($M_1$)

(A) $T_1$ cycle

Figure 4A:
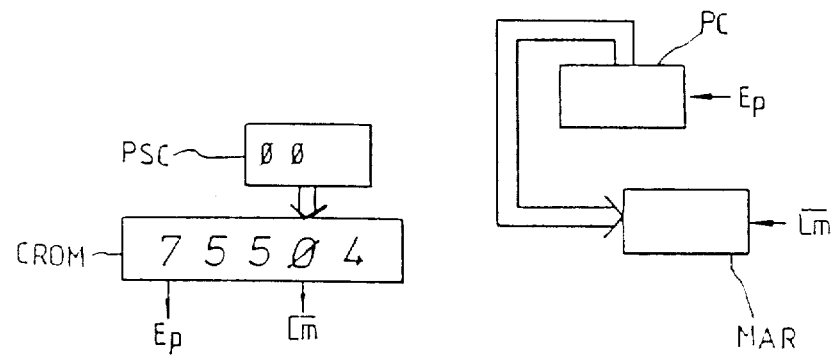
FIG. 4(a)–(d) illustrates another embodiment of the invention which displays the state of fetch cycles in a microcomputer.

As shown in FIG. 4(a) an initial state of 00 is displayed on the presettable counter PSC and the content 75504 in the address 00 as shown in Table 3 is displayed on the control ROM (CROM). Control signals operated simultaneously are Ep and $\overline{Lm}$ (See Display Example 1).

These signals are connected with the control signal Ep of program counter PC and the control signal $\overline{Lm}$ of memory address register MAR to be turned on simultaneously, and in a moment the content set into the program counter PC is moved through the data bus DB to the memory register MAR. The display state of data moving at this time is similiar to that in Embodiment 3 (See FIG. 3 and FIG. 15). If the memory address register MAR is enabled, then the monochromatic LED's for address selection display of the memory MEM in FIG. 2(g) are in accordance with the address pointed out by the enabled MAR.

(B) $T_2$ cycle

Figure 4B:
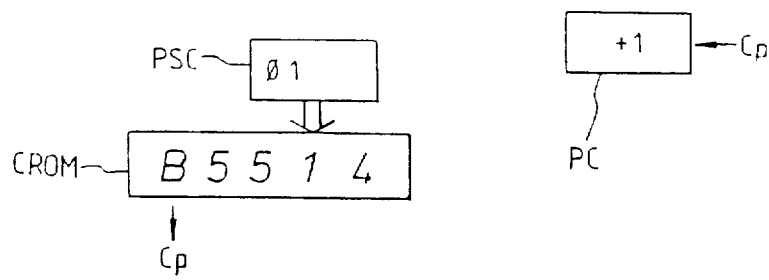

As shown in FIG. 4(b), the presettable counter PSC is incremented by one in accordance with a clock signal to display 01 and the content B5514 of this address is displayed on the control ROM (CROM), and according to this Cp only is turned on. Therefore, the content incremented by one is displayed on the program counter PC.

(C) $T_3$ cycle

Figure 4C:
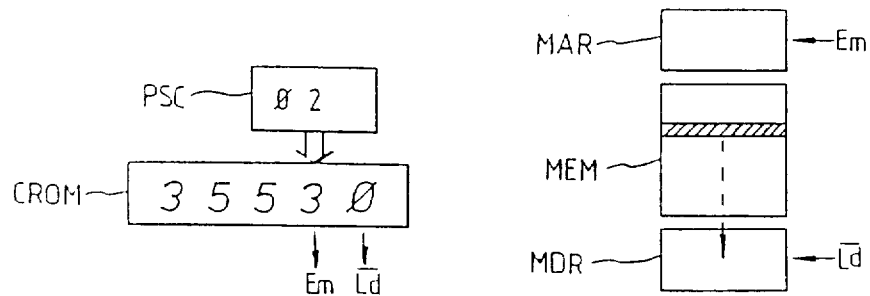

As shown in FIG. 4(c), on the presettable counter PSC is displayed the 02 incremented by one again in accordance with a clock signal, and the 35530 of address 02 is displayed on the control ROM (CROM) to turn on the control signals Em and $\overline{Ld}$. The memory (MEM) data pointed out by the memory address register MAR in accordance with said signals is written into the memory data register MDR.

(D) $T_4$ cycle

Figure 4D:
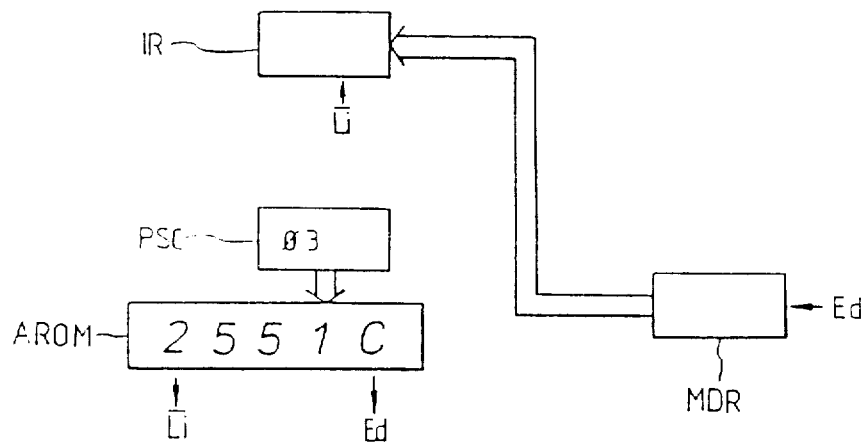

As shown in FIG. 4(d), on the presettable counter PSC to display the 03 incremented by one still again in accordance with a clock signal and the control ROM (CROM) the 2551C which is the content of address 03, and according to this the control signals Ed and $\overline{Li}$ are turned on.

Accordingly, the content stored in the memory data register MDR is loaded onto the data bus DB and written into the instruction register IR. The data moving display at this time also is displayed as the same operation as FIG. 3. In this manner, the fetch cycle $M_1$, which brings the instruction word pointed out by the program counter into the instruction register, is completed. If the instruction word is stored in the instruction register, then the signal $\overline{Ln}$ generated in the clock generator when the clock goes into "low" state and the signal $\overline{Ln}$ of the presettable counter PSC operate simultaneously to be decoded by storing the content of address ROM ARM in accordance with the instruction routine, thereby starting the execution cycle, as will be described hereinafter.

(2) The execution of ADD B routine ($M_2$)

Meaning: an instruction requesting addition of the content of accumulator to that of B register and storing the result in the accumulator.

Operation code: 2 (refer to Table 1)
Content of address ROM: 07 (refer to Table 2)
* The fetch cycle $M_1$ is similar to that of FIG. 4.

(A) $M_2$, $T_1$ cycle

Figure 5A:
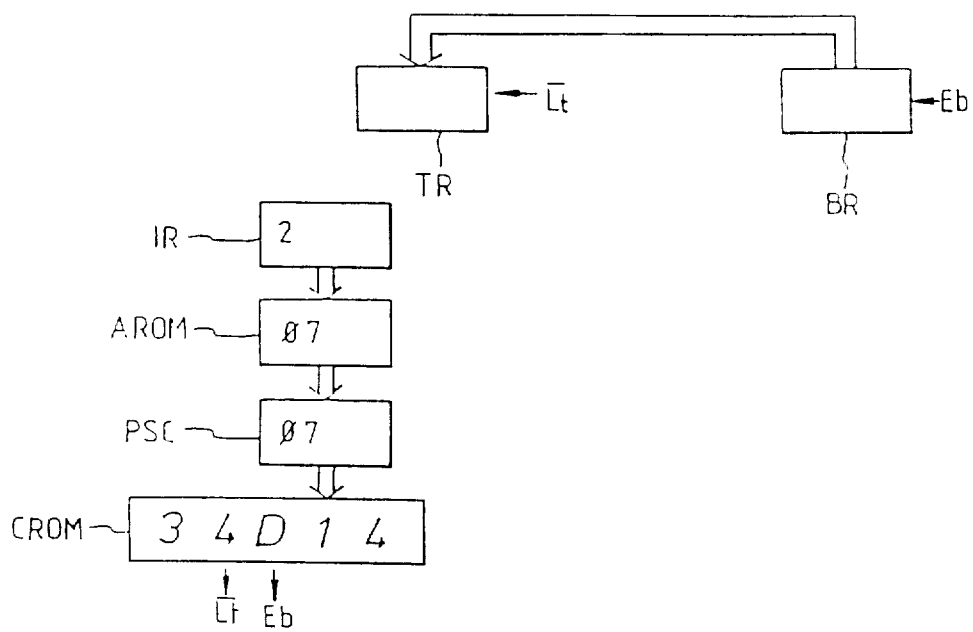
FIG. 5(a)–(c) illustrates still another embodiment of the invention which displays the operation upon executing ADD B routine.

As shown in FIG. 5(a), on the instruction register is displayed the operation code 2 of "ADD B" routine, and the content 07 of address number 2 is displayed on the address ROM AROM; 07 is also displayed on the presettable counter into which the above content is loaded. The content 34D14 of address number 07 is displayed on the control ROM (CROM) to turn on the control signals $\overline{Lt}$ and Eb. The content of B register BR is moved into the T register TR by these control signals.

(B) $M_2$, $T_2$ cycle

Figure 5B:
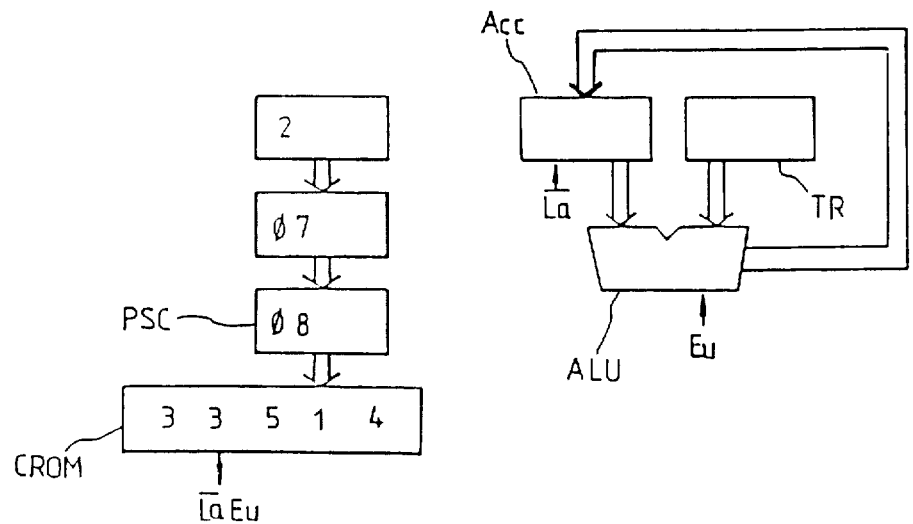
Figure 5C:
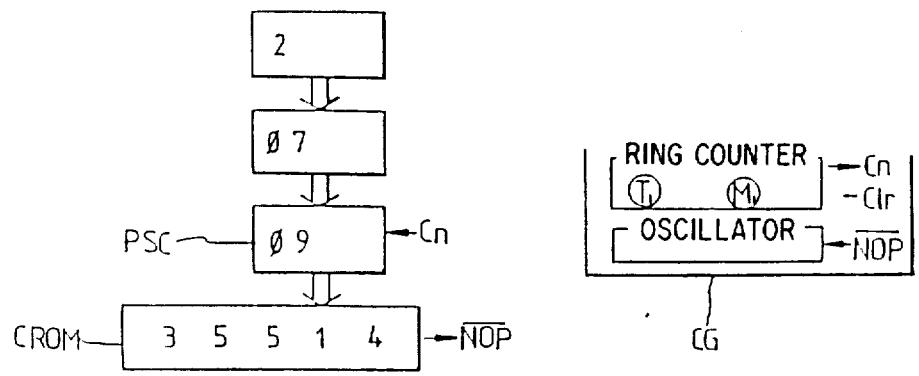

As shown in FIG. 5, the presettable counter PSC is incremented by one to become 08. The control ROM (CROM) becomes the content 33514 of address number 08, and accordingly Ea and La are turned on. By these signals the arithmetic unit ALU adds the content of accumulator ACC to that of T register TR, and then the result is stored in the accumulator ACC.

If the execution of instruction is completed in the manner described in FIG. 4(c), the presettable counter PSC is incremented by one again to become 09 and the control ROM (CROM) then becomes 35514. Since this content is not decoded, all control signals do not operate. At this time $\overline{NOP}$ is turned on. Since this $\overline{NOP}$ is connected with the $\overline{NOP}$ of clock generator CK to generate a signal CLR of ring counter, the ring counter is initialized and thus a signal Cn is turned on and the presettable counter PSC is cleared to 00 to thereby initiate a new $M_1$ cycle.

All the instruction words are processed in the manner described above and the number of execution cycles of the respective instruction words varies.

(3) Execution of ADC B routine ($M_2$)

Meaning: An instruction requesting addition of the contents of the accumulator and B register to the content of the carry flip-flop and then storing the result in the accumulator.

Operation code: 3
The content of the address ROM: 0A (A) $M_2$, $T_1$ cycle

Figure 6A:
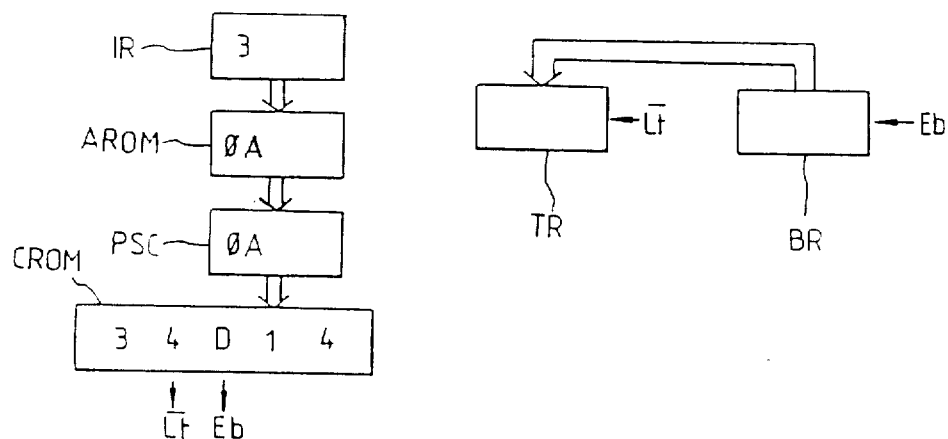
FIG. 6(a) and (b) illustrates still another embodiment of the invention which displays the operation upon executing ADC B routine.

As shown in FIG. 6(a), the content of the instruction register IR is displayed as 3 and the content of the address ROM AROM is displayed as 0A. As a result, the presettable counter PSC loads the content of the address ROM so as to become the state of 0A.

Accordingly, 34D14 is displayed in the control ROM (CROM) and control signals Eb and $\overline{Li}$ are turned on, thereby moving the content of the B register into the T register.

(B) $M_2$, $T_2$ cycle

Figure 6B:
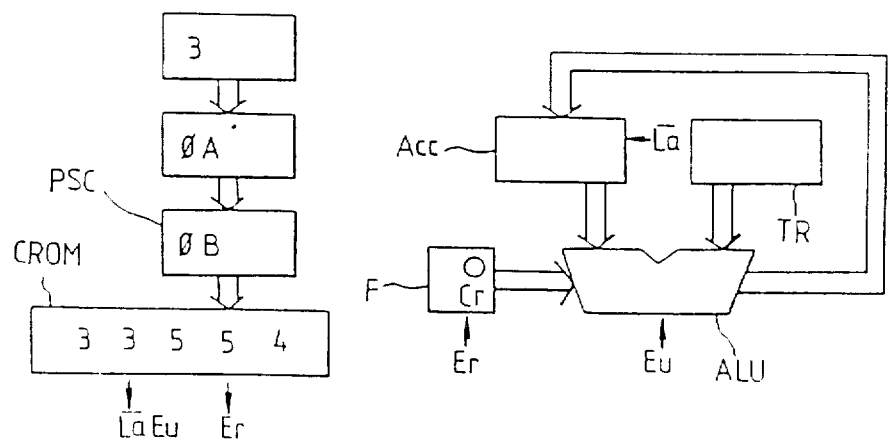

As shown in FIG. 6(b), the presettable counter PSC is incremented by one to become 0B and the control ROM (CROM) becomes 3554, and accordingly control signals Eu, Er and $\overline{La}$ are turned on. By these signals the arithmetic unit ALU adds the contents of the accumulator ACC and T register TR to a carry and then stores the result in the accumulator ACC again.

If the execution is completed, the presettable counter PSC is incremented by one to become 0C and the control ROM becomes 35514 so that in the manner described in FIG. 4(c), the ring counter is initialized and the presettable count is cleared. The following procedure is the same.

(4) Execution of MOV A,B routine ($M_2$)

Meaning: An instruction requesting storage of the content of the B register into the accumulator.

Operation code: 6
Content of address ROM: 13

(A) $M_2$, $T_1$ cycle

Figure 7:
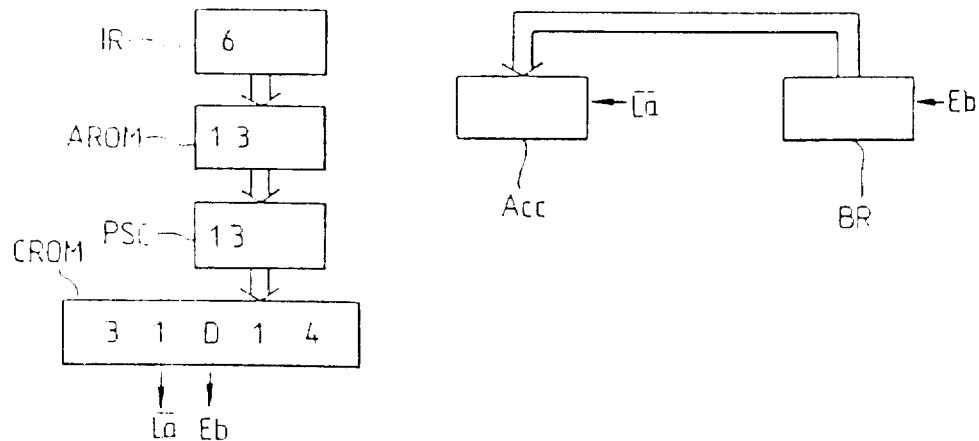
FIG. 7 illustrates still another embodiment of the invention which displays the operation upon executing MOV A,B routine.

As shown in FIG. 7, in the instruction register IR and address ROM 6 and 13 are displayed, respectively. 13 is displayed in the presettable counter PSC and 31D14 is displayed in the control ROM CROM, so that control signals Eb and $\overline{La}$ are turned on.

Accordingly, the content of the B register is stored in the accumulator ACC to complete the execution.

(5) Execution of MVI A, byte routine ($M_2$)

Meaning: An instruction requesting storage of the contents of the operand byte into the accumulator.

Operation code: A
Content of address ROM: 1B (A) $M_2$, $T_1$ cycle

Figure 8A:
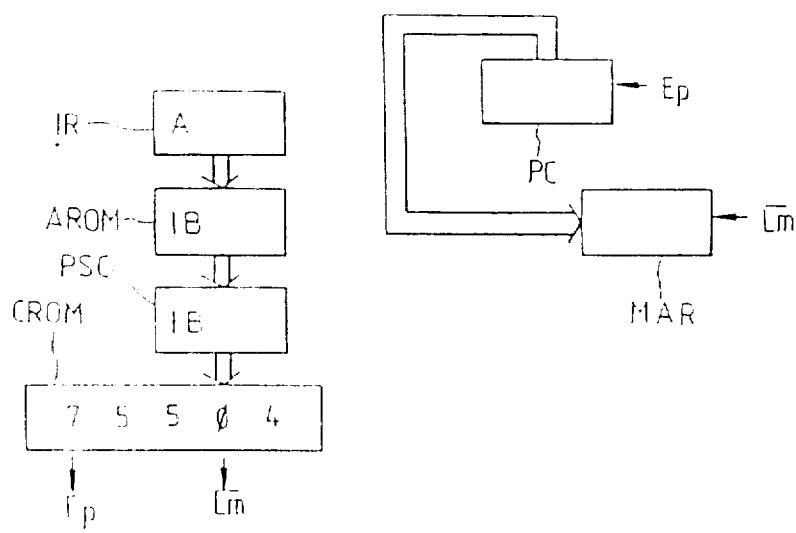
FIG. 8(a)–(d) illustrates still another embodiment of the invention which displays the operation upon executing MVI A, byte routine.

As shown in FIG. 8(a), the instruction register IR, the address ROM AROM and the presettable counter PSC become A, 1B and 1B and the control ROM CROM becomes 75504, so that control signals Ep and $\overline{Lm}$ are turned on. By these signals, the content of the program counter PC is moved into the memory address register MAR.

(B) $M_2$, $T_2$ cycle

Figure 8B:
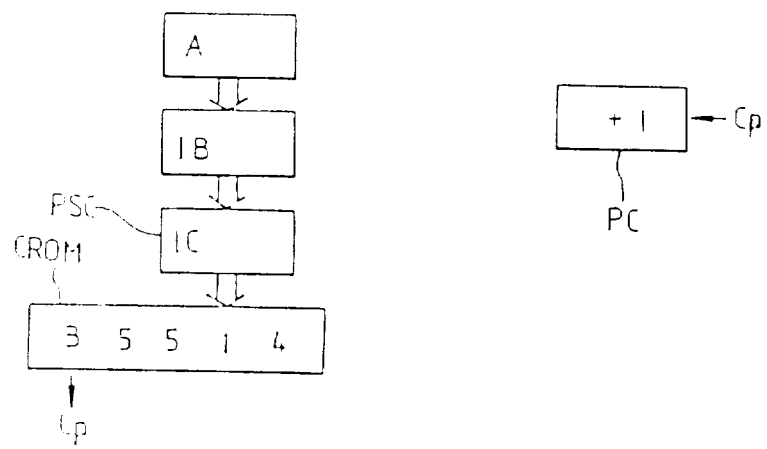

As shown in FIG. 8(b), the presettable counter PSC is incremented by one in accordance with a clock signal to become 1C and the control ROM CROM becomes B5514, so that a signal Cp is turned on. Consequently, by this signal the program counter PC is incremented by one.

(C) $M_2$, $T_3$ cycle

Figure 8C:
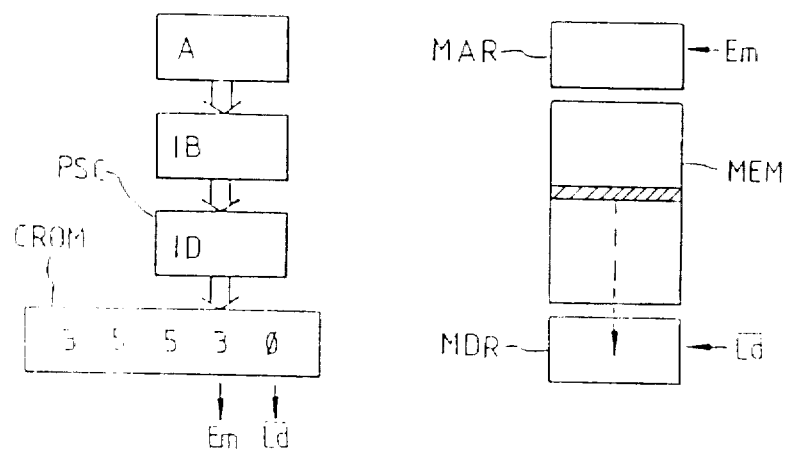

As shown in FIG. 8(c), the presettable counter PSC is incremented by one to become 1D and the control ROM CROM is displayed as 35530, so that control signals Em and $\overline{Ld}$ are turned on. By these signals, data of the memory MEM of the address pointed out by the memory address register MAR is loaded into the memory data register MDR.

(D) $M_2$, $T_4$ cycle

Figure 8D:
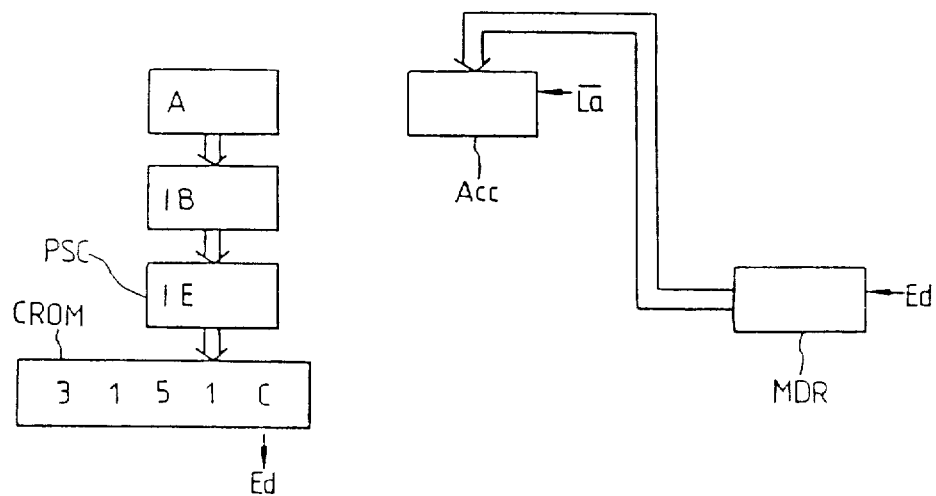

As shown in FIG. 8(d), the presettable counter PSC is incremented by one to become 1E and the control ROM (CROM) becomes 3151C, so that control signals Ed and $\overline{La}$ are turned on.

By these signals the content of memory MEM is loaded into the memory data register MDR, and accordingly the execution is completed.

(6) Execution of LDA (addr) routine ($M_2$, $M_3$)

Meaning: An instruction requesting storage of the data at the address pointed out by the operand into the accumulator.

Operation code: B
Content of address ROM: 20

(A) $M_2$, $T_1$ cycle

Figure 9A:
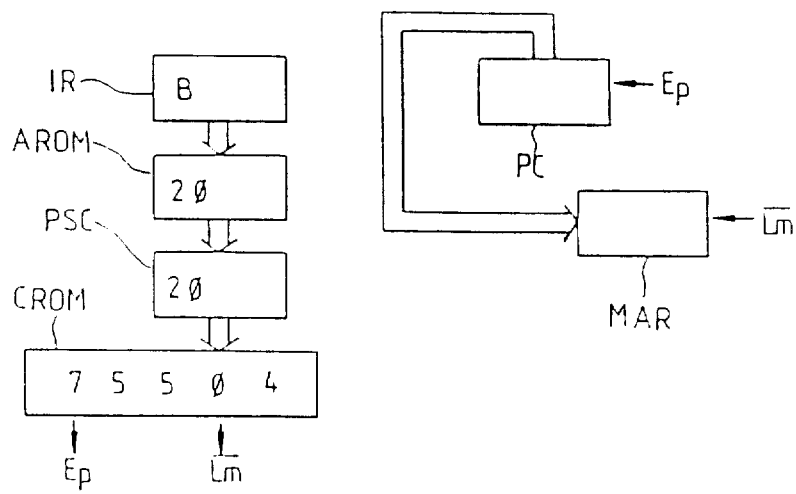
FIG. 9(a)–(f) illustrates still another embodiment of the invention which displays the operation upon executing LDA (addr) routine.

As shown in FIG. 9(a), the instruction register IR and address ROM AROM become B and 20, respectively; and thus the presettable counter PSC also becomes 20, and the control ROM (CROM) becomes 75504, so that control signals Ep and $\overline{Lm}$ are turned on. By these signals, the content of the program counter is loaded into the memory address register MAR.

(B) $M_2$, $T_2$ cycle

Figure 9B:
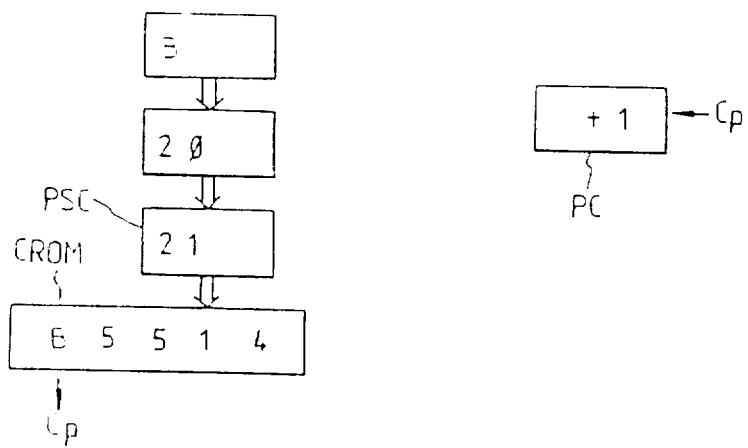

As shown in FIG. 9(b), the presettable counter becomes 21, incremented by one, and the control ROM (CROM) becomes B5514, so that a control signal Cp is turned on.

Consequently, the content of the program counter PC is incremented by one.

(C) $M_2$, $T_3$ cycle

Figure 9C:
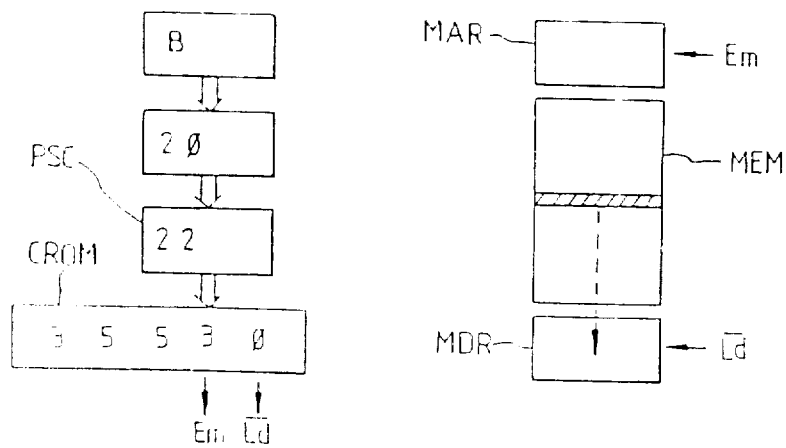

As shown in FIG. 9(c), the presettable counter PSC becomes 22 incremented by one again, and the control ROM (CROM) becomes 35530, so that control signals Em and $\overline{Ld}$ are turned on. By these signals, the memory (MEM) data of a address pointed out by the memory address register MAR is written into the memory data register MDR.

(D) $M_2$, $T_4$ cycle

Figure 9D:
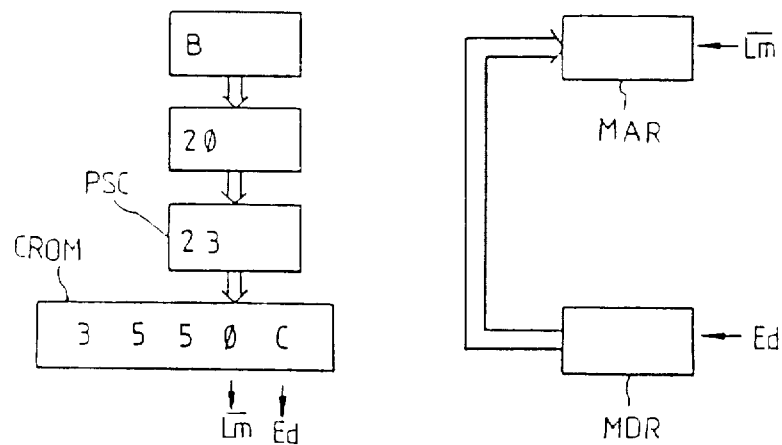
Figure 9E:
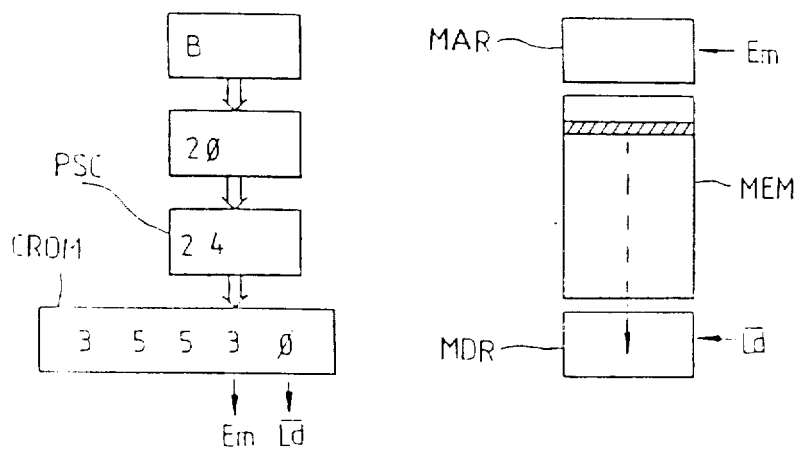

As shown in FIG. 9(d), the presettable counter PSC increments by one to become 23 and the control ROM (CROM) becomes 3550C, so that control signals Ed and $\overline{Lm}$ are turned on.

By these signals the contents written into the memory data register MDR are loaded into the memory address register MAR again, so that an execution cycle $M_2$ is ended and an execution cycle $M_3$ is continued.

(E) $M_3$, $T_1$ cycle

As shown in FIG. 9(a), the presettable counter PSC increments by one to become 24 and the control ROM (CROM) becomes 35530, so that control signals Em and $\overline{Ld}$ are turned on. Accordingly, the memory (MEM) data of an address pointed out by the memory address register MAR is written into the memory data register MDR.

(F) $M_3$, $T_2$ cycle

Figure 9F:
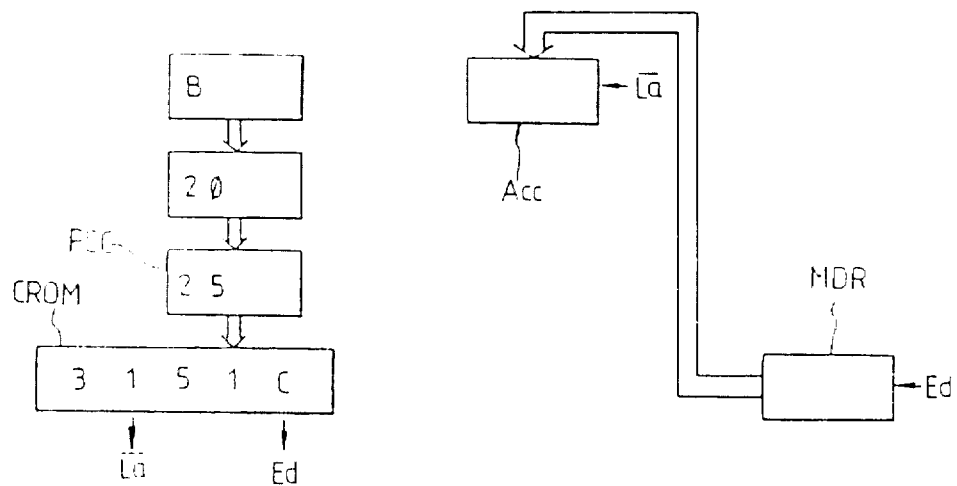

As shown in FIG. 9(f), the presettable counter PSC increments by one to become 25 and the control ROM (CROM) becomes 3151C, so that control signals Ed and $\overline{Ld}$ are turned on. The content written into the memory data register MDR is stored in the accumulator ACC. In the manner described above, all the execution cycles are completed.

(7) Execution of STA (addr) routine ($M_2$, $M_3$)

Meaning: An instruction requesting storage of the contents of the accumulator into the memory of an address pointed out by the operand.

Operation code: C
Content of address ROM: 27

(A) $M_2$ cycle

A control signal operating with the content of the control ROM at this time is identical to the $M_2$ cycle of the LDA (addr) routine as shown above.

(B) $M_3$, $T_1$ cycle

Figure 10A:
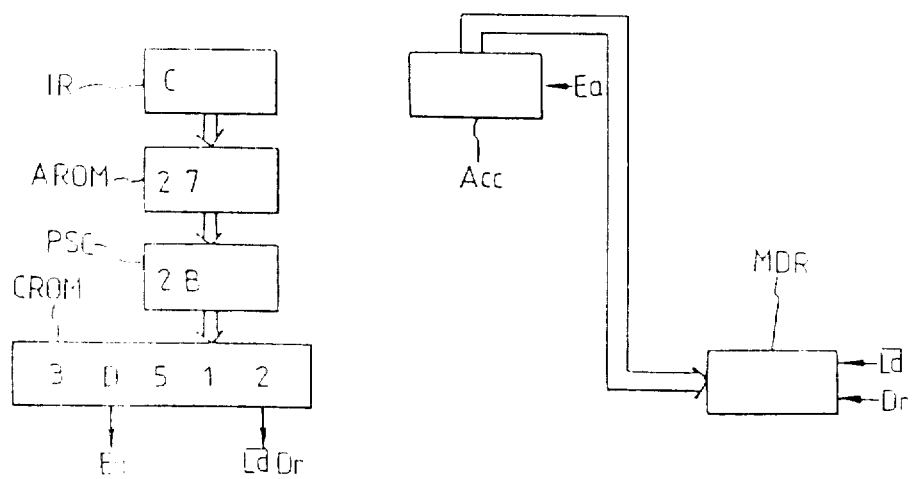
FIG. 10(a) and (b) illustrates still another embodiment of the invention which displays the operation upon executing STA (addr) routine.

As shown in FIG. 10(a), the presettable counter PSC becomes the content 2B incremented continuously by one per cycle, and the control ROM (CROM) becomes 3D512, so that control signals Ea, $\overline{Ld}$ and Dr are turned on. Herein, a signal Dr is intended to control the transfer direction of data in the memory data register MDR. If there is a Dr signal, the moving of materials is directed from the central processing unit to the storage unit; if not, the moving of materials is directed to the contrary.

Accordingly, the contents of the accumulator are written into the memory data register MDR.

(C) $M_3$, $T_2$ cycle

Figure 10B:
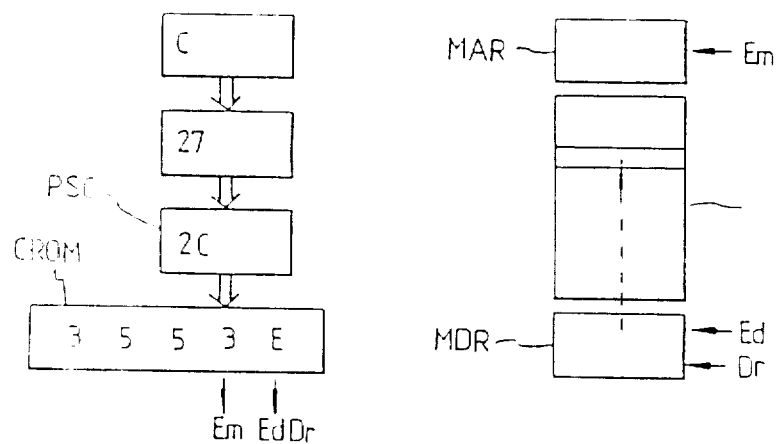

As shown in FIG. 10(b), the presettable counter PSC becomes 2C, incremented by one, and the control ROM (CROM) becomes 3553E, so that control signals Ed, Em and Dr are turned on. By these signals, the content of the memory data register MDR is newly stored into the memory MEM of an address pointed out by the memory address register MAR, and thus execution is completed.

(8) Execution of JAP (addr) routine ($M_2$)

Meaning: An instruction requesting to jump the program execution into an address pointed out by the operand.

Operation code: D
Content of address ROM: 2E (A) $M_2$, $T_1$ cycle

Figure 11A:
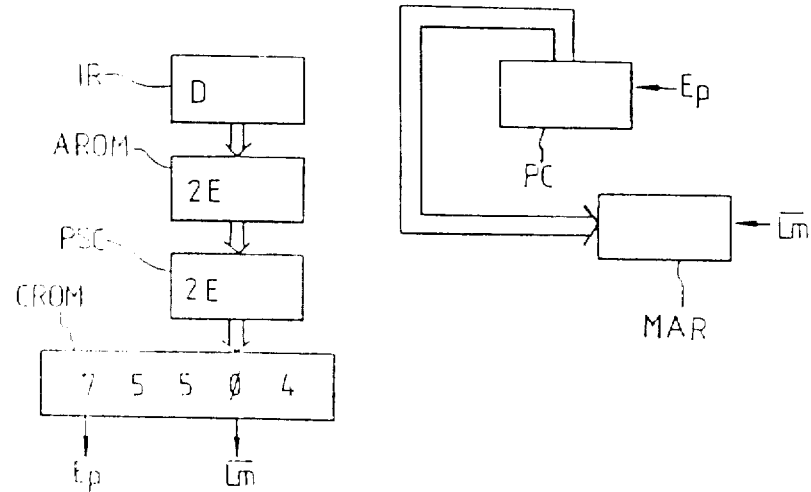
FIG. 11(a–(c) illustrates still another embodiment of the invention which displays the operation upon executing JMP (addr) routine.

As shown in FIG. 11(a), since the instruction register IR and address ROM AROM become D and 2E, respectively; the presettable counter PSC also becomes 2E; and the control ROM (CROM) comes to 75504; control signals Ep and $\overline{Lm}$ are turned on. By these signals the content of the program counter PC is loaded into the memory address register MAR.

(B) $M_2$, $T_2$ cycle

Figure 11B:
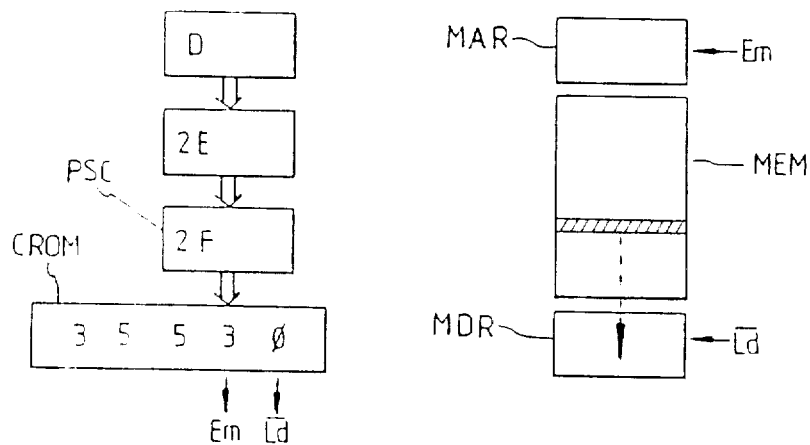

As shown in FIG. 11(b), the presettable counter PSC increments by one to become 2F and the control ROM (CROM) becomes 35530, so that control signals Em and $\overline{Ld}$ are turned on. By these signals the memory (MEM) data of an address pointed out by the memory address register MAR is written into the memory data register MDR.

(C) $M_2$, $T_3$ cycle

Figure 11C:
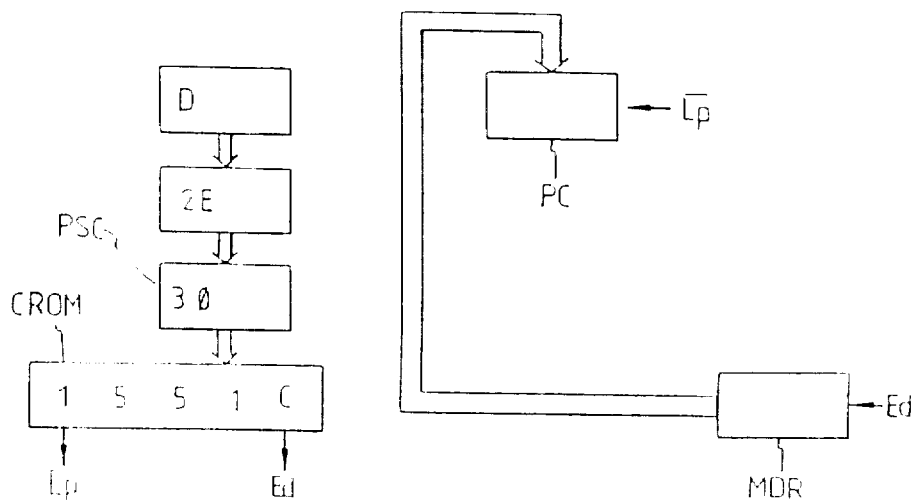

As shown in FIG. 11(c), the presettable counter PSC increments by one to become 30 and the control ROM (CROM) becomes 1551C, so that control signals Ed and Lp are turned on.

By these signals, the content stored in the memory data register MDR is loaded into the program counter PC. In the manner described above the execution is completed.

(9) Execution of IN A routine ($M_2$)

Meaning: An instruction requesting storage of the contents of the input port into the accumulator.

Operation code: E
Content of address ROM: 32

(A) $M_2$, $T_1$ cycle

Figure 12:
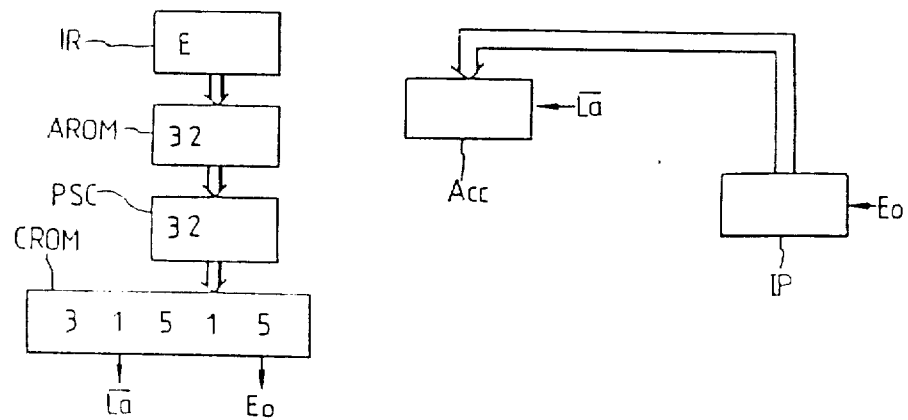
FIG. 12 illustrates still another embodiment of the invention which displays the operation upon executing IN A routine.

As shown in FIG. 12, the instruction register IR and address ROM AROM become E and 32, respectively; also, the presettable counter PSC becomes 32 and the control ROM (CROM) becomes 31515, so that control signals Eo and $\overline{La}$ are turned on. By these signals, the content set into the input port IP is stored into the accumulator ACC, and thus the execution is completed.

(10) Execution of HLT routine

Meaning: An instruction requesting interruption of all operations.

Operation code: F
Content of address ROM: 35

Figure 13:
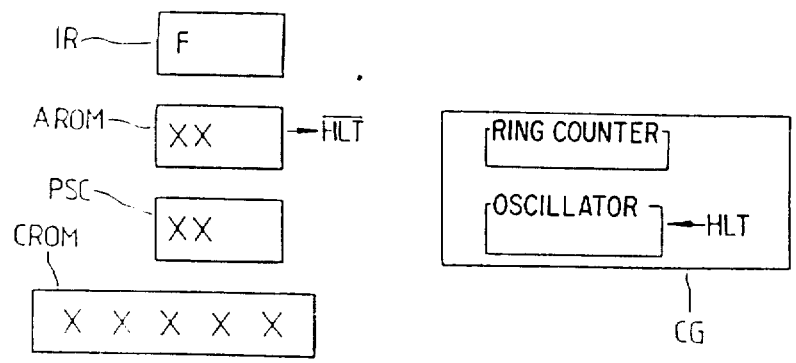
FIG. 13 illustrates still another embodiment of the invention which displays the operation upon executing HLT routine.

If the above instruction is decoded, then, as shown in FIG. 13, a signal $\overline{HLT}$ is connected to interrupt clocks of the clock generator CG. A removal of this interruption is performed by the control keyboard CK.

(11) Execution of NOP routine
Meaning: no operation is carried out
Operation code: O
Content of address ROM: 34

Figure 14:
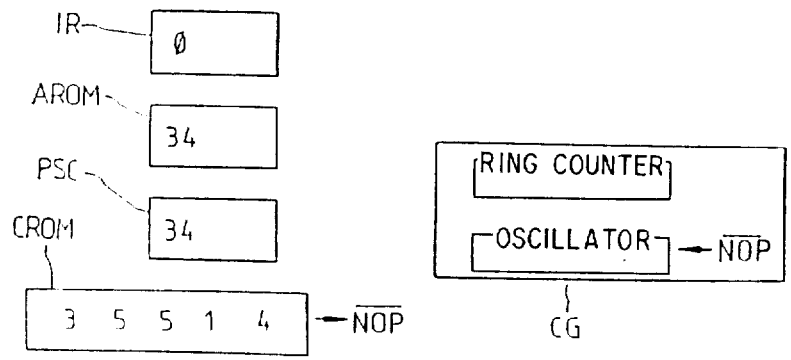
FIG. 14 illustrates still another embodiment of the invention which displays the operation upon executing NOP routine.

If this instruction is decoded, then, as shown in FIG. 14, the control ROM (CROM) becomes 35514, which is the content of address number 34 so that there are no selected control signals.

Accordingly, a signal $\overline{\text{NOP}}$ is connected to initialize the ring counter of the clock generator CG.

As a result, no operation is performed and a latch cycle of the next instruction is started.

INDUSTRIAL APPLICABLITY

As described above, according to the present invention, all the operations of a microcomputer can be understood by users because the operational state in a variety of registers and memories, as well as the moving data, are displayed as hexadecimal numbers and binary numbers distinguished by color. Thus, learners can directly confirm the operation of the microcomputer visually. In other words, a device of the present invention can enhance the training effect dramatically for learners or beginners on microcomputers.

In the above description, the present device has been explained for a 4-bit microcomputer, but the present invention is not limited to this and could be applied to 8-bit, 16-bit and 32-bit microcomputers.

Also, it has been assumed that data is shifted bit-by-bit in the present invention, but it should be understood by a person skilled in the art that various modifications could be made without departing from the scope and spirit of the invention. For example, it is possible to allow data to be shifted by the nibble unit (4 bit) or byte unit (8 bit).

What is claimed is:

1. A device for visually displaying the operation of a microcomputer comprising:
    an arithmetic display section, an accumulator display section, a program counter display section, an instruction register display section, a T.B.C. register display section, a flag display section, an address read only memory display section, a presettable counter display section, a control read only memory display section, a memory display section, a memory address register display section, an input port display section and a clock generator display section for displaying a configuration of the microcomputer, each of said display sections being established divisionally on a front panel of a box-shaped training apparatus for simulating the operation of a microcomputer;
    a hexadecimal keyboard and a control keyboard installed therein;
    a data bus display unit connecting said display section; and
    means for executing logic and arithmetic operations by orders for simulating the operation of a real microcomputer.

2. A device according to claim 1, further comprising a character display section which includes a 5×7 dot matrix character displays on the upper portion of the front panel of said training apparatus for simulating the operation of said microcomputer.

3. A device according to claim 1, wherein said of said display sections for displaying the configuration of the microcomputer is constituted of at least one hexadecimal displays and a series of light-emitting diodes, each of said light-emitting diodes for representing a single bit.

4. A device according to claim 3, wherein each of said light-emitting diodes is a two-colored light-emitting diode distinguished by red and green colors.

5. A device according to claim 1, wherein said data bus display section connected with each of said display sections for displaying the configuration of the microcomputer is constituted of a plurality of linearly arranged light-emitting diodes.

6. A device according to claim 5, wherien each of said light-emitting diode is a two-colored light-emitting diode distinguished by red and green colors.

7. A device according to claim 1, wherein in said control read only memory display section has a plurality of hexadecimal displays and monochromatic light-emitting diodes for displaying simulated control signals generated by said means, four of said monochromatic light-emitting diodes being provided below each hexadecimal display for displaying control signals in the instruction register display section.

8. A device according to claim 1, wherein said memory display section is constituted of at least one hexadecimal displays for displaying the addresses and at least one hexadecimal displays for displaying the data.

9. A device according to claim 8, wherein a monochromatic light-emitting diode for selecting the addresses is installed beside each of said hexadecimal displays for displaying the addresses.

10. A method for displaying the operation of a microcomputer wherein a real microcomputer is connected with a training apparatus for simulating the operation of a microcomputer which displays a configuration of the microcomputer in a form of block, comprising the steps
    simultaneously displaying contents of various register displays for simulating the operation of the microcomputer in the form of hexadecimal numbers (O-F) and binary numbers (1,0) by employing numeral displays and two-colored light-emitting diodes respectively, each color of said two-colored light-emitting diodes representing a single bit by a red light-emitting diodes corresponding to binary number 1 and a green light-emitting diodes corresponding to binary number 0, said two-color light-emitting diodes being lit to respectively display binary numbers corresponding to a displayed hexadecimal number; and
    displaying the simulated data in a memory display in hexadecimal form together with a separate memory address display therefor.

11. A method according to claim 9, wherein a plurality of said two-colored light-emitting diodes (LED's) are linearly arranged between said register displays for simulating passage of binary data representing a hexadecimal number through a data bus, wherein an LED is lit to represent each bit of said hexadecimal number resulting in a pattern of lit LEDs representing said hexadecimal number, and said pattern is shifted by one LED at a time from one register display to another.

12. A method according to claim 14, wherein said simulating of passage of binary data is such that one bit of data is shifted completely and thereafter the next bit of data is shifted.

13. A method according to claim 10, further comprises the step of displaying an operational state of the microcomputer wherein setting states of input data to said memory and various register displays and a programming executing state of the microcomputer are displayed as characters by employing a 5×7 matrix character display.

* * * * *